US011750669B1

(12) United States Patent
Conger et al.

(10) Patent No.: US 11,750,669 B1
(45) Date of Patent: Sep. 5, 2023

(54) PERSONALIZED CONTEXTUAL CONNECTION OF ITEMS IN A MULTI-USER SYSTEM

(71) Applicant: Microsoft Technology Licensing, LLC, Redmond, WA (US)

(72) Inventors: David Jon Conger, Issaquah, WA (US); Jason Glenn Silvis, Bellevue, WA (US); Keith John Symons, Issaquah, WA (US); Simon Wai-Han Chan, Berlin (DE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/726,062

(22) Filed: Apr. 21, 2022

(51) Int. Cl.
*H04L 65/402* (2022.01)
*H04L 65/403* (2022.01)
*H04L 12/18* (2006.01)

(52) U.S. Cl.
CPC ........ *H04L 65/402* (2022.05); *H04L 12/1818* (2013.01); *H04L 12/1831* (2013.01); *H04L 65/403* (2013.01)

(58) Field of Classification Search
CPC .............. H04L 12/18–1831; H04L 65/40–403
See application file for complete search history.

(56) References Cited

U.S. PATENT DOCUMENTS

| | | | |
|---|---|---|---|
| 7,249,123 B2 | 7/2007 | Elder et al. | |
| 9,165,064 B2 | 10/2015 | Brown | |
| 9,501,761 B2 | 11/2016 | Richards et al. | |
| 10,176,156 B2 | 1/2019 | Wessling et al. | |
| 2008/0172464 A1 | 7/2008 | Thattai et al. | |
| 2013/0117376 A1 | 5/2013 | Filman et al. | |
| 2014/0330911 A1 | 11/2014 | Hunter et al. | |
| 2015/0378995 A1 | 12/2015 | Brown et al. | |
| 2016/0100019 A1* | 4/2016 | Leondires | H04L 63/105 709/204 |
| 2016/0255139 A1* | 9/2016 | Rathod | H04N 1/32101 709/203 |
| 2017/0277696 A1 | 9/2017 | Sekharan | |
| 2020/0293975 A1 | 9/2020 | Faulkner et al. | |

FOREIGN PATENT DOCUMENTS

WO    WO 2014051577    *    4/2014

OTHER PUBLICATIONS

Harrison, Kyle, "Building the Global Knowledge Graph: Dreaming the Dream for Roam Research", Retrieved From: https://roambrain.com/building-the-global-knowledge-graph/, Retrieved on Jan. 24, 2022, Sep. 23, 2020, 11 Pages.
"International Search Report and Written Opinion Issued in PCT Application No. PCT/US23/012370", dated Apr. 6, 2023, 11 Pages.

* cited by examiner

*Primary Examiner* — Clayton R Williams
(74) *Attorney, Agent, or Firm* — Talem IP Law, LLP

(57) ABSTRACT

A personalized contextual connection management system can identify and store contextual connections for shared items associated with particular users of a multi-user system, for example, in response to requests associated with certain tasks to user services in which a shared item is referenced. When a particular user requests to view the shared item, the personalized contextual connection management system obtains that user's personalized context including the contextual connections associated with that user for that shared item and provides that user's personalized context for display with the shared item.

20 Claims, 15 Drawing Sheets

PERSONALIZED CONTEXTUAL CONNECTION OF ITEMS IN A MULTI-USER SYSTEM

BACKGROUND

Users share digital information with one another using various platforms. For example, one user may correspond with other users online via electronic teleconference meetings, online chat discussion, by collaborating on document sharing/editing tasks using an online platform, etc. Suppose that the user wishes to create an online note that is to be shared with other users. The user may create the note and send the note to others via email. The user may also send the same note to users engaged in a teleconference meeting. In addition, the user may share the note in a collaborative platform for other users to view and edit in other environments. Each user may have a relationship or connection to the note. A context of the note may relate the note to a task a user was a part of when engaging with the note.

Currently, contextual information about the note may be stored as part of the note, for example, as metadata. However, when the contextual information is stored with the note, any user who accesses the note may be able to also access the contextual information and may contribute to additional contextual information stored as part of the note. For applications that support presenting contextual information, this may result in users seeing context that is not relevant to them or may result in the applications having to perform additional processes to determine who has access to what particular context. This issue can be exacerbated in large multi-user systems where many users have access to and interact with a particular note.

BRIEF SUMMARY

A multi-user system for managing personalized contextual connection of items in a is described.

A personalized contextual connection management system can identify and store contextual connections for shared items associated with particular users of a multi-user system, for example, in response to requests associated with certain tasks to user services in which a shared item is referenced. When a particular user requests to view the shared item, the personalized contextual connection management system obtains that user's personalized context including the contextual connections associated with that user for that shared item and provides that user's personalized context for display with the shared item.

A method of managing personalized contextual connections associated with shared items in a multi-user system can include receiving, from a first client application associated with an identifier of a first user, a first request associated with a first task; identifying, from the first request, the identifier of the first user, a first reference to a shared item, and an identifier of a second user; identifying a first contextual connection for the shared item for the identifier of the first user in view of the first task; storing the first contextual connection for the shared item associated with the identifier of the first user; identifying a second contextual connection for the shared item for the identifier of the second user in view of the first task; and storing the second contextual connection for the shared item associated with the second user. The first contextual connection and the second contextual connection can refer to a same type of contextual connection.

The method can further include receiving, from a second client application associated with an identifier of the second user, a second request associated with a second task; identifying, from the second request, at least an identifier of a third user and a second reference to the shared item; identifying a third contextual connection for the shared item for the identifier of the third user in view of the second task; and storing the third contextual connection for the shared item associated with the identifier of the third user. In some cases, the method can further include identifying, from the second request, the identifier of the second user; identifying a fourth contextual connection for the shared item for the identifier of the second user in view of the second task; and storing the fourth contextual connection for the shared item associated with the identifier of the second user. In such a case, the first user does not have a contextual connection for the shared item in view of the second task and therefore would not have access to information regarding the second task while both the second user and the third user would.

The method can further include receiving a first view request associated with viewing the shared item, where the first view request indicates the shared item and the identifier of the first user; responding to the first view request with personalized context of the first user for the shared item, wherein the personalized context of the first user for the shared item includes the first contextual connection; receiving a third view request associated with viewing the shared item, where the third view request indicates the shared item and the identifier of the third user; and responding to the third view request with personalized context of the third user for the shared item, wherein the personalized context of the third user for the shared item includes the third contextual connection. For the case where the personalized contextual connection management system identified the fourth contextual connection, when the system receives a second view request associated with viewing the shared item, where the second view request indicates the shared item and the identifier of the second user, the system can respond to the second view request with personalized context of the second user for the shared item, wherein the personalized context of the second user for the shared item includes the second contextual connection and the fourth contextual connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
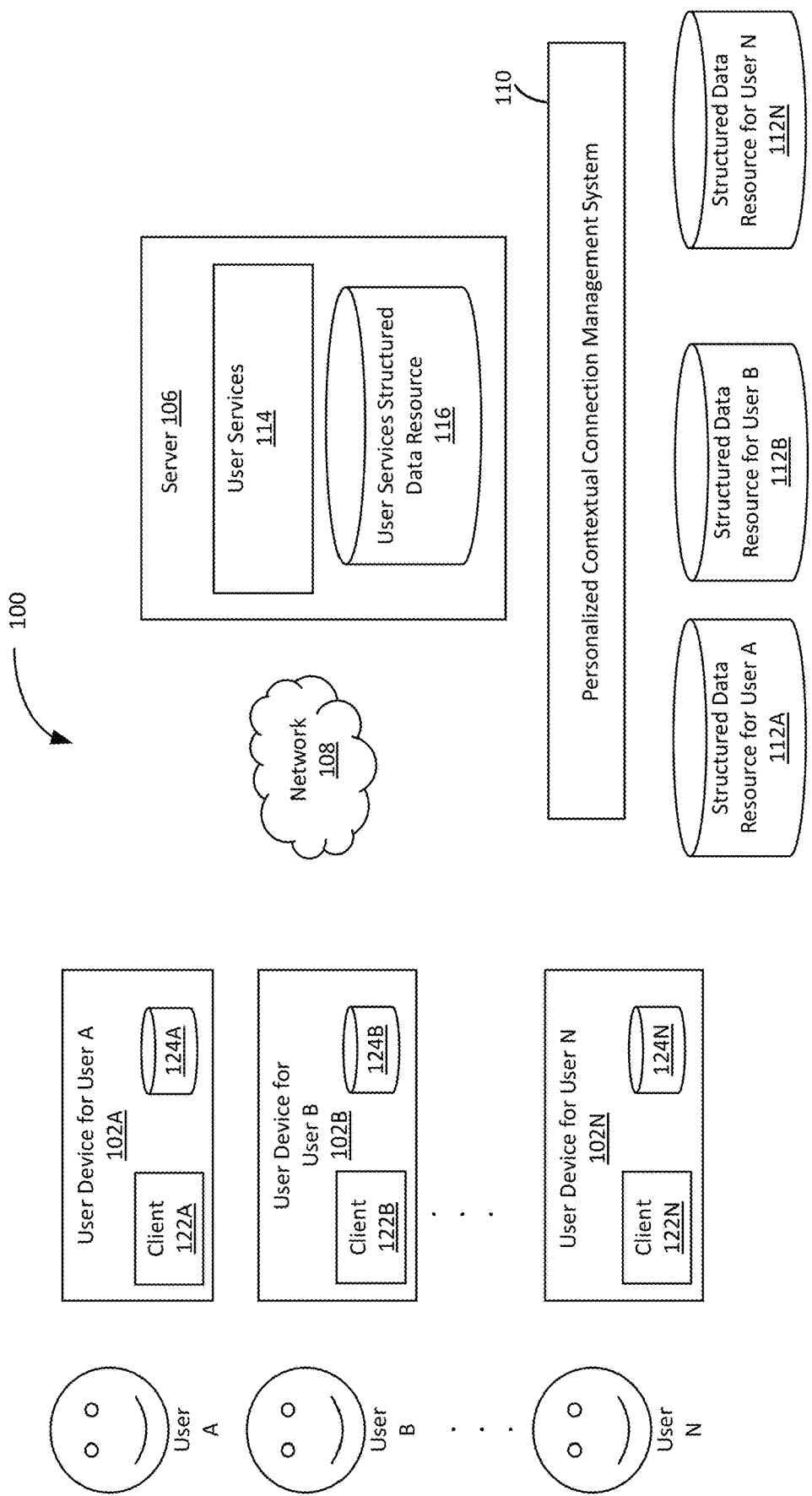
FIG. 1A illustrates an example operating environment for managing personalized contextual connections associated with a shared item in a multi-user system.

Managing of personalized contextual connections for items in a multi-user system is described. An item may contain any kind of audio, video, and/or textual information. In one example, an item may be a digital note, also simply referred to as a note. An item may be shared amongst users using any of a variety of methods and protocols such as by email, digitally transferred within teleconference meetings, online collaboration platform sharing services, online transfer protocols, SMS (short message Service), multimedia messaging service (MMS), etc. The item may also be available in a shared repository, for example, an enterprise file repository.

It can be desirable to support providing personal context of an item that may be shared or available to other individuals. That is, personal context can be helpful for someone to view when returning to an item to assist with that person recalling where they may have left off or how the item relates to them. Indeed, personal context can include information regarding what task the user was engaged in with respect to the item or how a user is related to the item. In a multi-user environment that enables multiple users to access (and even edit) content and files, it can be desirable for a user to maintain personalized context with respect to those items (i.e., context that is directed to that person with respect to the item and which may be based on an activity involving multiple individuals). Personalized context is a type of personal context of a user.

When a user engages with an item (e.g., shares an item with another user while engaged in a task, edits the item, creates the item, etc.), the user has a relationship with the item with respect to the task. This relationship is referred to as a user's contextual connection to the item and is part of the user's personal context. The contextual connection of a user to an item is indicative of a task that the user was a part of when engaging with the item. In one example, one user may share the item with another user by email. With this activity, both users' contextual connection to the item is email, as the item was shared between the users through the email (a task). In another example, one user may share an item with another user while engaged in a teleconference meeting. Both users' contextual connection to the item is teleconference meeting. Thus, a user's contextual connection to an item describes the user's relationship to the item. As another example, a specific user may be mentioned in the item itself resulting in a contextual connection for that specific user. In some examples, the contextual connection of a user to an item is indicative of a particular task, such as a teleconference meeting, a document, an email, an online discussion, or other activities between users within a digital ecosystem.

A user may have a personalized contextual connection to an item that no other user has in common with that user or a user may have a personalized contextual connection to the item that is the same as other another user's (users') contextual connection(s). Users may also have multiple contextual connections to an item.

As described above, some users may have the same contextual connection to the item; for example, users that were participants of the teleconference meeting would all have a contextual connection to the item that is teleconference meeting. Other users may have a different contextual connection to the same item; for example, users that were email recipients that received the item would all have a contextual connection to the item that is email.

By managing contextual connections and other personalized context for an item in a multi-user system, a personalized contextual connection management system enables users to view items alongside the users' contextual connections to items. If a user does not have a contextual connection to an item, that user is not provided with access to view that contextual connection (which may not be relevant to that user). Thus, contextual connections to items may indicate the relevancy of the note to users who have access to view them in a manner that is personal to that specific user.

Details regarding the personalized contextual connection management system in a multi-user system that maintains and manages personalized contextual connections associated with an item are described with respect to FIG. 1A.

FIG. 1A illustrates an example operating environment for managing personalized contextual connections associated with a shared item in a multi-user system. Referring to FIG. 1A, a shared item personalized contextual connection management environment 100 includes user devices (a user device 102A, a user device 102B, . . . a user device 102N that may each be controlled by user A, user B, . . . , user N, respectively), a server 106 providing user services 114, user services structured data resource 116, a network 108, a personalized contextual connection management system 110, and a structured data resource for user A, 112A, a structured data resource for user B, 112B, . . . and a structured data resource for user N, 112N. Although multiple structured data resources are depicted, in other embodiments, fewer or greater than the depicted structured data resources may be used.

Structured data resources 112A, 112B, . . . 112N store associated personalized contextual connections for shared items and are managed by the personalized contextual connection management system 110. The personalized contextual connections for the shared items may be determined by user experiences, a server, a client application, the personalized contextual connection management system, or another entity. The personalized contextual connection management system 110 identifies and stores the contextual connections and generates personalized contextual connections that may be provided in a format that is viewable by a user. Additional details regarding managing contextual connections are provided herein with respect to FIGS. 2A and 2B.

Figure 1B:
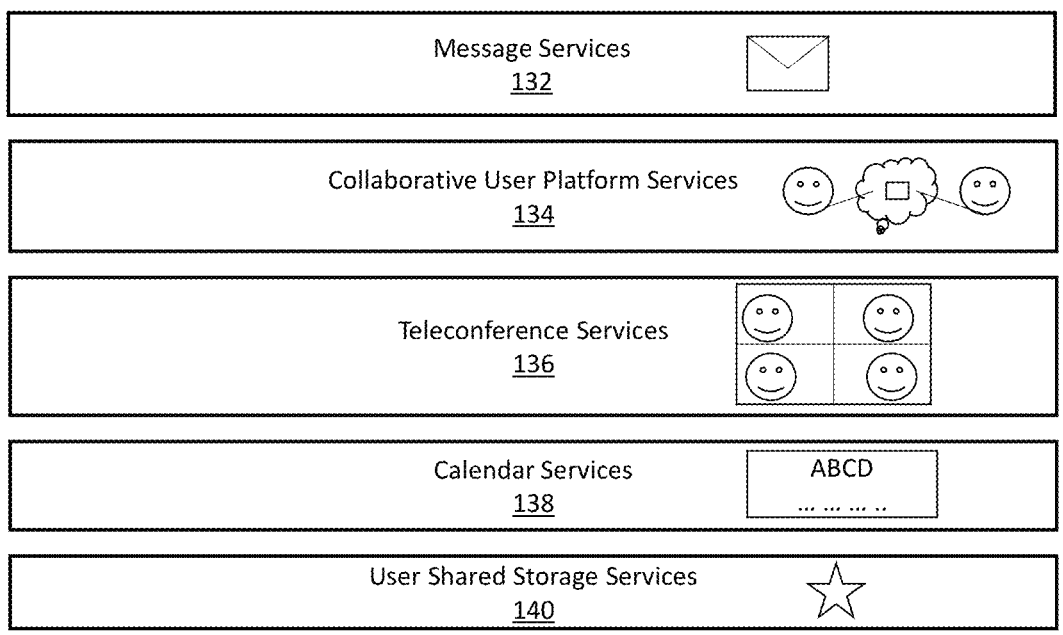
FIG. 1B illustrates example user services that can include or communicate with a personalized contextual connection management system.

Example user services 114 are described with respect to FIG. 1B. User services structured data resource 116 may store shared items that have corresponding personalized contextual connections managed by the personalized contextual connection management system 110.

The personalized contextual connection management system 110 and/or the structured data resource for user A, 112A, the structured data resource for user B, 112B, . . . and/or the structured data resource for user N, 112N may be part of a same system (e.g., co-located devices such as part of a server and associated storage), part of the same networked system (i.e., connected to each other via an internal network), or involve remote devices across different data centers/locations. The personalized contextual connection management system 110 may be hosted on cloud-based or site-based servers and may communicate via internal networks (not depicted) or via the network 108. User contextual connections to items may be stored in a structured data resource for that user (e.g., the structured data resource for user A, 112A, the structured data resource for user B, 112B, ... and/or the structured data resource for user N, 112N). The structured data resource that contains the contextual connections may use any suitable data structure such as graphs and databases. The personalized contextual connection management system 110 accesses and manages the information on contextual connections (and other personal context) for each individual user.

Server 106 includes user services 114 and user services structured data resource 116. However, in other embodiments, user services 114 and/or user services structured data resource 116 may be external to and otherwise communicate with server 106 and one another. Server 106, user services 114, and/or personalized contextual connection management system 110 may each be implemented within a single computing device or distributed across multiple computing devices or sub-systems that cooperate in executing program instructions. In various implementations server 106, user services 114, and personalized contextual connection management system 110 may collectively, individually, or in combination be embodied as described with respect to system 700 described with respect to FIG. 7A. Accordingly, more or fewer elements described with respect to server 106, user services 114, and/or personalized contextual connection management system 110 may be incorporated to implement a particular system.

User device 102A, user device 102B, ... user device 102N (also generally referred to herein individually or in any combination as a user device 102) each include a client application 122A, a client application 122B, ... a client application 122N (also generally referred to herein individually or in any combination as a client application 122), respectively, and a local structured data resource 124A, a local structured data resource 124B, ... a local structured data resource 124N (also generally referred to herein individually or in any combination as a local structured data resource 124), respectively.

The client application 122 (i.e., the client application 122A, the client application 122B, ... the client application 122N) can be any suitable application that provides a user with the ability to create and/or otherwise access a shared item, correspond with user services 114 (described in FIG. 1B), engage in shared activities with other users, etc. Example client applications are email applications, office suite applications, collaboration applications, notebook applications, and the like. More than one such application may be on a user device 102. The local structured data resource 124 (i.e., the local structured data resource 124A, the local structured data resource 124B, ... the local structured data resource 124N) may store local copies of items. Users may access the local copies of items when a user device is offline and not connected to a network (e.g., the Internet).

Although three user devices are depicted for exemplary purposes, fewer or greater user devices than depicted may be implemented. A user may operate user device 102 to create an item and/or otherwise obtain access to an item. In an embodiment, the user device 102 may include one or more computing devices such as personal computers (PCs), laptops, mobile phones, smart phones, tablet computers, netbook computers etc. User device 102 may include a display (not depicted) that allow users to view text, images, videos, web pages, documents, etc. User device 102 may be embodied as described with respect to computing device 750 of FIG. 7B.

Components depicted in FIG. 1A (the user devices 102A, 102B, ... 102N, the server 106, user services 114, the personalized contextual connection management system 110, and/or the structured data resource for user A, 112A, the structured data resource for user B, 112B, ... and the structured data resource for user N, 112N) may operate on or in communication with each other over network 108. Network 108 can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. Network 108 may include one or more connected networks (e.g., a multi-network environment) including public networks, such as the Internet, and/or private networks such as a secure enterprise private network. Access to network 108 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

FIG. 1B illustrates example user services that can include or communicate with a personalized contextual connection management system. FIG. 1B depicts example services 130 which may be user services 114 in FIG. 1A. One or more of the example services 130 may be in the environment 100 in FIG. 1A and operate as described with respect to user services 114 (and may be embodied as part of a server such as server 106). Example services 130 include message services 132 such as email message services, chat message services, cross-platform centralized instant messaging services, audio, video, and/or multimedia messaging services, etc.; collaborative user platform services 134 such as services that permit sharing of items (documents and/or multimedia contents) and permit users to collaborate on shared items; teleconference services 136 that allow users to participate in audio, video, textual, and/or multimedia teleconferencing; calendar services 138 that allow users to create calendar invitations/entries or otherwise access calendars; and user shared storage services 140 that allow sharing and/or collaborative editing of documents, videos, multimedia content, webpages, etc.

Services 130 may include other services that allow interaction between multiple users and permit sharing of items. Services 130 may be external to server 106 and communicate with server 106 (of FIG. 1A) or internal to server 106.

Figure 2A:
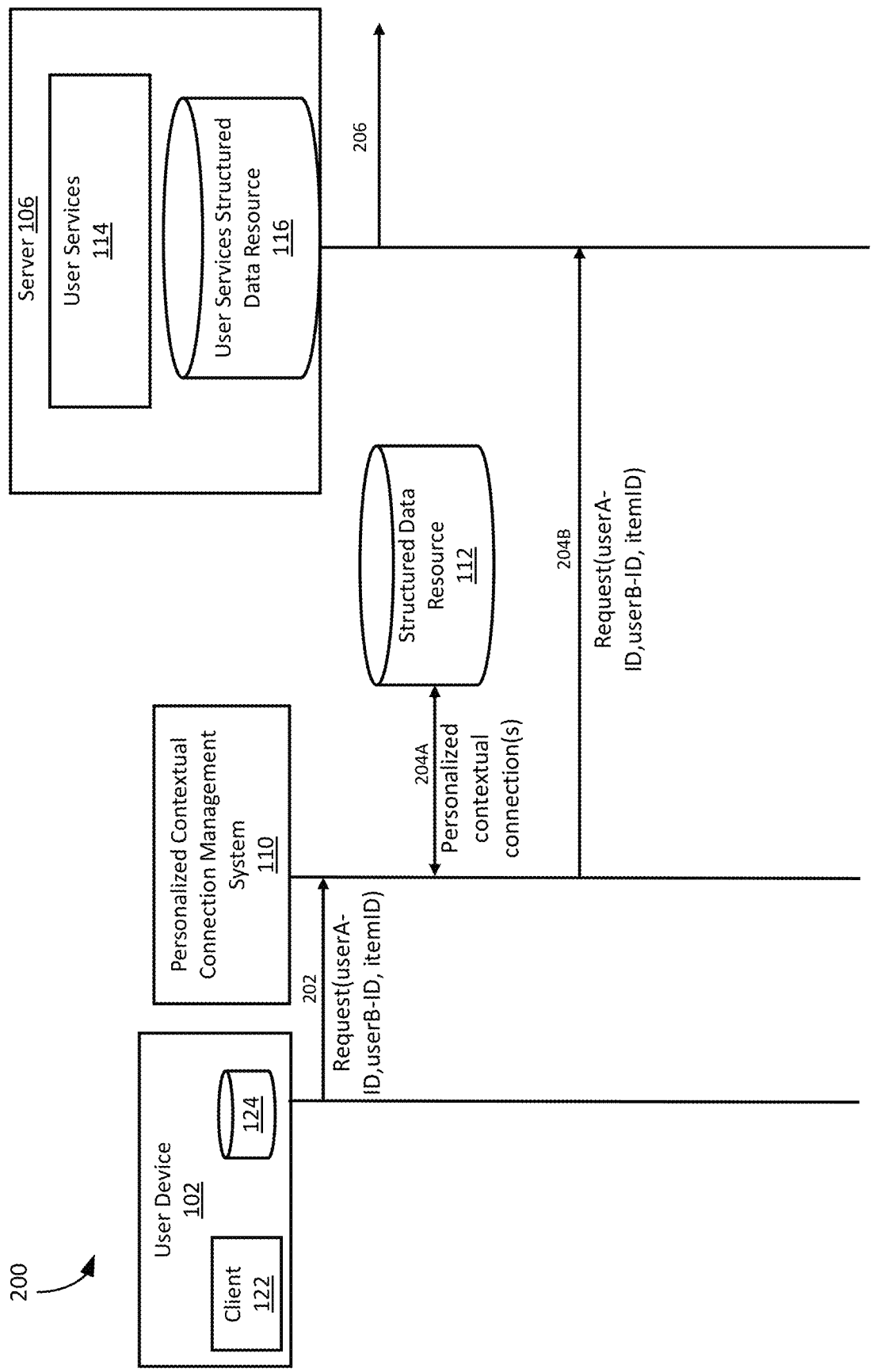
FIG. 2A illustrates an example flow for requests for tasks for items and managing contextual connections.

FIG. 2A illustrates an example flow for requests for tasks for items and managing contextual connections. Environment 200 provides the interaction between various entities when a request for a task is made.

A user employing user device 102 can perform a particular task via an appropriate application which may communicate a task request to an associated user service to perform the task. A task may be teleconference meeting, a document, an email, an online discussion, or other activities between users within a digital ecosystem. The user is associated with a unique user ID which may be alphanumerical, symbolic, or represented by any type of representation to identify a user and is referred to as an ID. The user ID may be a login name for the user.

As part of the task request, the user may reference an item. That is, the task request can include an indication of another item (e.g., a user may attach a note or a link to a note in an email). The item may be stored locally in local structured data resource 124 or in remotely elsewhere.

When a user sends a request for a task related to an item, the request for the task is accompanied an identification of the user (ID) who requested the task along with the identification of other users (IDs) who may be linked to or are otherwise associated with the task (and are thus determined to have a contextual connection to the item). As described above, the request for the task may also include reference to the item. This information may be stored in any format in the request. In one embodiment, this information may be stored as metadata in data packets that include the request.

Suppose that a first user wishes to share the item via email with a second user. The first user may wish to attach the shared item to the email, for example. The first user's device client application 122 sends the request for the task to the user services 114 so that user services 114 carries out the task. In order to do so, the client application 122 may send the request to the personalized contextual connection management system 110, as shown in step 202 in FIG. 2A. The personalized contextual connection management system 110 receives the request for the task (e.g., a first request associated with a first task from a client application for the first user) and sends the request for the task to the user services 114, as shown in step 204B.

The task request (e.g., to send an email) may include the ID of the first user, the ID of the second user within whom the item is to be shared with, along with a reference to the shared item. The reference to a shared item may be provided as a code or by other identification. In this example, the item to be shared with the first and second user may be referred to as a shared item.

Once the user services 114 receives the request, at step 206, the user services 114 may take steps to perform the task. User services 114 may store content associated with the task in the user services structured data resource 116, depending on the particular user service.

Prior to, simultaneously to, or otherwise separate from forwarding the task request to the user services 114, the personalized contextual connection management system 110 identifies contextual connections for the shared item associated with users (e.g., the user that sent the request for a task as well as other users who the user wanted to share access to the item with, where the other users are identified in this case by their identification in the task request), as shown in step 204A. In one embodiment, the task is indicative of the contextual connection to the item for a user (e.g., email). If the contextual connections for a user are created by a different entity than the personalized contextual connection management system 110 (for example, by the client application 122 such as when other types of contexts are included), the entity may communicate the contextual connection with the personalized contextual connection management system 110.

For example, the personalized contextual connection management system 110 identifies, from the first request, an identification of the first user (ID of user A), a first reference to a shared item, and an identifier of the second user (ID of user B). The reference to the shared item identifies the shared item. The personalized contextual connection management system 110 identifies a first contextual connection for the shared item for the identifier of the first user in view of the first task. The personalized contextual connection management system 110 may identify the contextual connection for the shared item for the identification of the first user (ID of user A) by parsing the request, analyzing the task, or otherwise receive information (e.g., from an application) of that particular user's contextual connection for the shared item. Similarly, the personalized contextual connection management system 110 identifies a second contextual connection for the shared item for the identifier of the second user (ID of user B) in view of the first task, for example, by parsing the request, analyzing the task, or otherwise receive information of that particular user's contextual connection for the shared item. The contextual connections may be determined by the personalized contextual connection management system 110, the client application 122, the server 106, the user services 114 or another entity that is in communication with the personalized contextual connection management system 110. In some cases, the personalized contextual connection management system 110 maintains a record of which contexts are appropriate for a user. For some of such cases, the personalized contextual connection management system 110 may be informed about certain context for the item for the current user. For example, the personalized contextual connection management system 110 may be informed about other users that are related or the personalized contextual connection management system 110 may query a related context items system to see whether there is context that should be stored for other users.

Alternatively, instead of storing the context for a particular user at creation time (e.g., when a task that references the item is requested), the determination can be made at runtime (e.g., when an item is requested to be viewed) by the personalized contextual connection management system 110 making a secondary request to a related system. For instance, if the contextual connection for an item is a "channel," when another user (who did not make the context of the task associated with the channel) requests the item, the request for context is made, for example, by the personalized contextual connection management system 110 performing a look up of the itemID, identifying a context of a channel (irrespective of the user), and then querying the channel management system to see if the current user has access to that context. If so, the context is returned (and in some cases cached for some period of time in the personalized contextual connection management system 110 for faster future access), if not, that context is not returned.

The contextual connections for the shared item associated with various users may be stored in one structured data resource or in multiple structure data resources. The personalized contextual connection management system 110 may store the contextual connections in structured data resource 112. For example, the personalized contextual connection management system 110 stores the first contextual connection for the shared item associated with the identifier of the first user (ID of user A). The personalized contextual connection management system 110 may store the first contextual connection in structured data resource for user A, 112A (and/or in another structured data resource such as structured data resource 124B. The personalized contextual connection management system 110 stores the second contextual connection for the shared item associated with the second user. The personalized contextual connection management system 110 may store the first contextual connection in the structured data resource for user B, 112B (and/or in another structured data resource such as structured data resource 124B.

The personalized contextual connection management system 110 may store the contextual connections in structured data resource 112. The personalized contextual connection management system 110 may store the personalized contextual connection associated with each user in a data resource (e.g., a structured data resource 112 (as depicted) and/or a local structured data resource 124 (not depicted)). In some cases, the contextual connections may be stored in multiple locations to allow for access to items even when a user device is offline.

The personalized contextual connection management system 110, after identifying the contextual connections, determines that the first and second user's contextual connection to the shared item is email.

As various tasks are requested that reference the shared item, the personalized contextual connection management system 110 updates the structured data resource(s) 112 containing the contextual connections for relevant users to that shared item. For example, suppose after the second user views the shared item, the second user shares or otherwise references a third user with respect to the shared item (e.g., by an inline comment—"@" calling—the third user), a client application associated with the second user (and which the second user is using to view the shared item and/or share/reference the third user) can communicate a second request associated with the task (e.g., a second task which may be different from or the same type of task as the first task in the example described above) to the user services 114 or personalized contextual connection management system 110. The personalized contextual connection management system 110 can thus identify personalized contextual connections to the shared item with respect to at least the third user from the second request (e.g., by the inclusion of information of the shared item and the identifier of the third user). The personalized contextual connection for the shared item for the third user can be stored in the structured data resource for user N, 112N (and/or in another structured data resource such as structured data resource 124N.

As described above, the personalized contextual connection management system 110 may manage contextual connections to the item associated with users by identifying and storing them. The personalized contextual connection management system 110 uses the contextual connections in order to generate personalized contextual connections for shared items for users based on their respective contextual connections to the shared item. The personalized contextual connections are indicative of a respective relevancy of the shared item to a respective user in view of a respective task. As will be described in further detail with respect to FIG. 2B, the personalized contextual connections that are generated can be provided to a user device so that a personalized contextual connection can be displayed to a user. The personalized contextual connections may be provided together with the item for display or separately.

Suppose that a user wishes to access the item that is referenced in the task request. For example, a user may wish to open, view, download, or otherwise access the item. Details regarding the user accessing the item are described herein with respect to FIG. 2B.

Figure 2B:
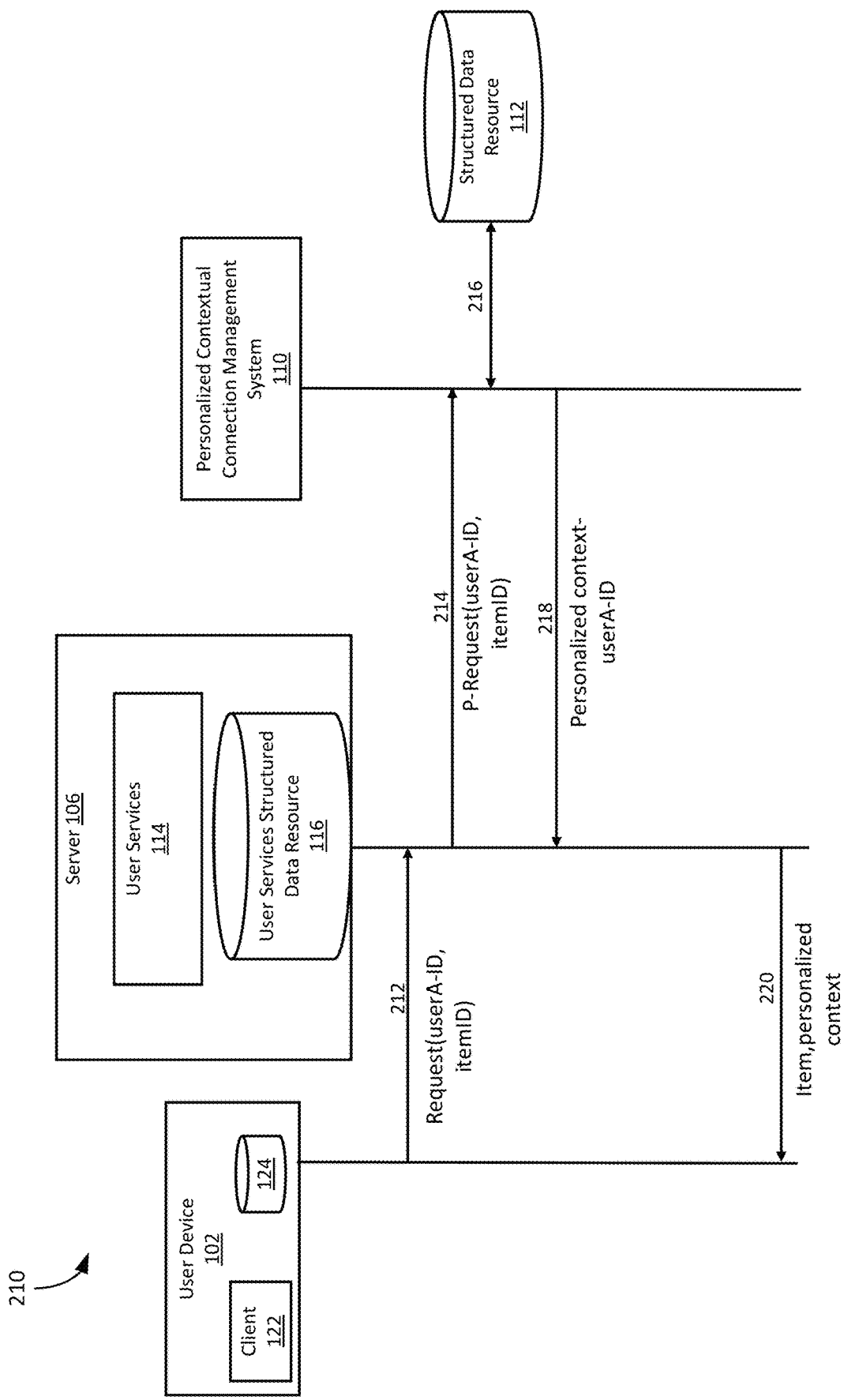
FIG. 2B illustrates an example flow of the generation and providing for display of personalized contextual connections.

FIG. 2B illustrates an example flow of the generation and providing for display of personalized contextual connections. Environment 210 provides the interaction between various entities when in response to a task completion, a user requests access to an item and the user's personalized contextual connection to the item. The user may wish to view the item that was referenced in the task request. The user, via an associated application, may send a request to view the item. Specifically, at step 212, the user employing user device 102, may send the request to view the item via user device 102 to user services 114. As described above, the item may be stored in user services structured data resource 116. It should be understood that the particular user services 114 that is used to access the item may not be the same services as that used to request the task to be performed.

At step 214, user services 114 sends a request to personalized contextual connection management system 110 to obtain the user's personalized contextual connection to the item. At step 216, the personalized contextual connection management system 110 retrieves the user's contextual connection from structured data resource 112. As described above, the user's contextual connection is stored in structured data resource 112.

At step 218, the personalized contextual connection management system 110 responds to the request by transmitting the personalized contextual connection associated with the item for the user to user services 114. User services 114, at step 220, provides the personalized contextual connection as well as the item for display at user device 102. User device 102 can display the item as well as the personalized contextual connection/context. The personalized contextual connection may be provided in any format for display. In one example, the personalized contextual connection may be provided by the user services 114 within the item as metadata and surfaced for display according to rules by the application for displaying contextual information. In another example, the personalized contextual connection may be displayed as part of a menu or panel of a graphical user interface of the application. In yet other examples, the personalized contextual connection may surface separately from the item.

Multiple users may have different contextual connections to the same shared item. When a user, via their respective application on their user device, requests to view the item, the personalized contextual connection management system 110 in conjunction with the application-associated user services 114 is able to provide that user's specific personalized context.

Users may receive shared item and be able to view their associated personalized contextual connections. The user services 114 and/or the server 106 may have access to the associated personalized contextual connections (which are generated by the personalized contextual connection management system 110) and users may be able to view their personalized contextual connections of the shared item which are indicative of a relevancy of the shared item to a user in view of a task.

Temporal and Other Rules

In an embodiment, rules may be set for the contextual connections of items. For example, the user services 114 and/or the server 106 may provide the item alongside a user's contextual connection to the item based on a temporal element (e.g., within or after a certain period of time passes). That is, whether to display the user's contextual connection to the item may be time based and that time determines when the user has a particular contextual connection to the item. As one example, after a time period passes, the contextual connection to the item may be removed. As another example, the contextual connection to the item may not surface for a user until after a time period passes. A rule may also indicate changes in and revocation of contextual connections to items. In one example, when a user leaves a meeting channel, a rule may indicate that the user's contextual connection to a shared item within the meeting channel ceases or is changed. The contextual connection rules may be stored along with the contextual connections and may be accessible by the personalized contextual connection management system 110. In addition, or in the alternative, the rules may also be stored and accessible by user services 114 and/or the server 106. When a user accesses the shared item again, the personalized contextual connection management system 110 may check to see if there are any updates to the contextual connections for the shared item for users to determine contextual connections have changed. In some cases, if multiple contexts are possible for a user, the personalized contextual connection management system 110 may rank the most relevant 1-N, either only returning a subset of most relevant contexts or providing data to the client to determine which context to prioritize, especially if space is limited for where the context can be shown.

Additional details regarding various contextual connections are described with respect to FIG. 3A, 3B, and FIGS. 4A-4F.

User Experiences

Users may create items, share items as well as create requests for tasks to be performed. Certain contextual connections for the shared items for users can be determined based on the requests for tasks.

Figure 3A:
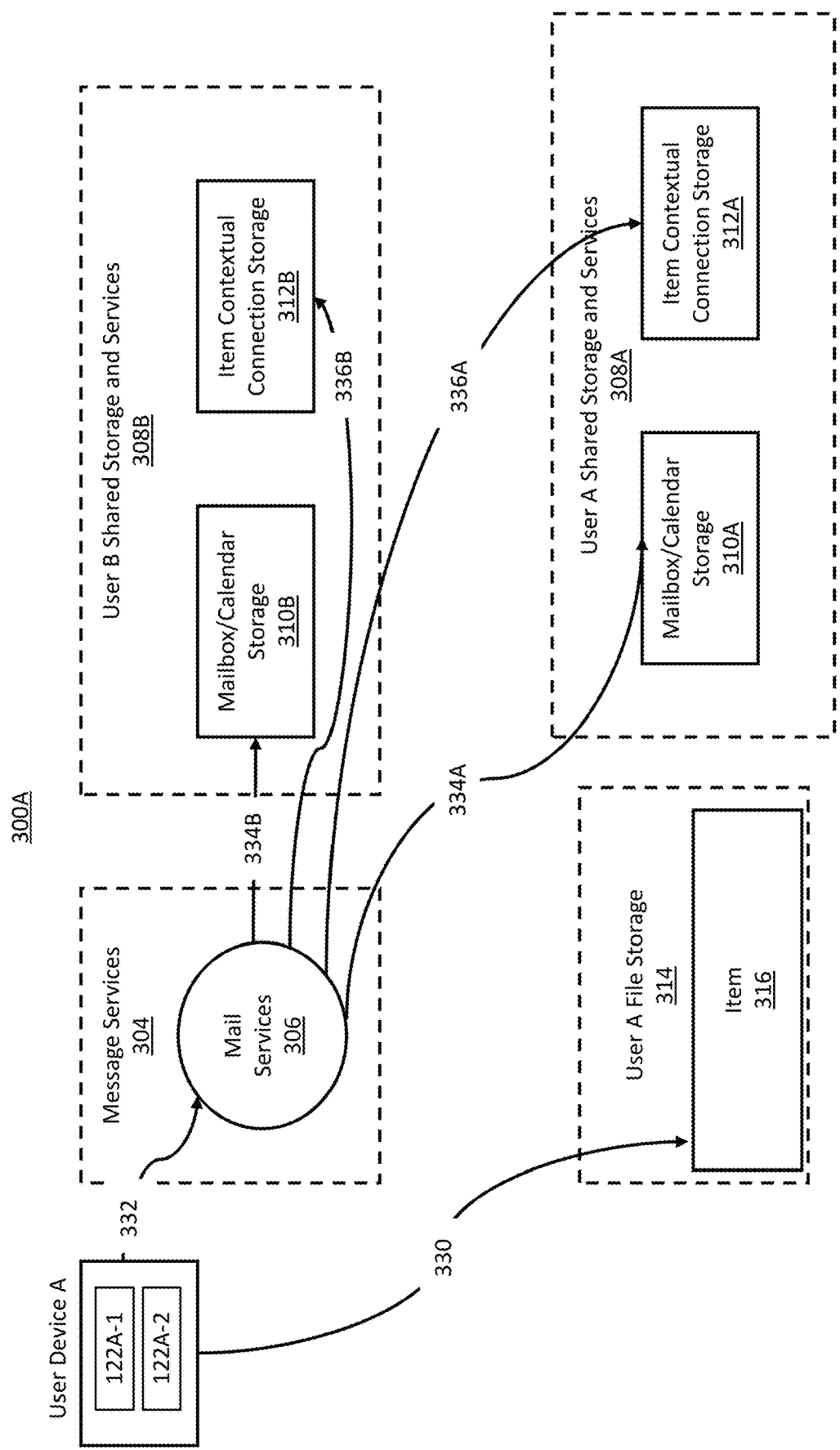
FIG. 3A illustrates an example user flow for contextual connections to items.

FIG. 3A illustrates an example user flow for contextual connections to items. User flow environment 300A illustrates user flows stemming from activity of user A. Not shown is a personalized contextual connection management system 110, which would receive information from client applications and/or the various user services and store the personalized contextual connections in the item contextual connection storage 312A, 312B.

Referring to FIG. 3A, at step 330, the user A, via first client application 122A-1, creates an item and the item is stored in a user A file storage 314 as item 316. For example, first client-application 122A-1 may be a notebook application and the item is a note.

Suppose that user A wishes to create a meeting request and include the item within the meeting request. The meeting request may include user B as the recipient. At step 332, the user A, via second client application 122A-2, creates the meeting invitation and sends the meeting request to user B via the message services 304. Specifically, the mail services 306 of the message services 304 receives the meeting request that references the item (e.g., as an attachment or link). The meeting request can be considered a request associated with a task, where the task is the meeting invitation. The request may include an ID for user A (as the sender) and an ID for user B (as the recipient). The request may further include a reference to the shared item. The reference may include a code, a file name, or other way of identifying the shared item.

The personalized contextual connection management system (not depicted) may receive the request from the client application and forward the request to the mail services 306 of the message services 304 or may receive the request (or information about the request) from the mail services 306.

At step 334A, the mail services 306 of the message services 304 creates the meeting and adds the calendar invitation in the mailbox/calendar storage 310A in user A's shared storage and services 308A.

User B (not shown) may receive the calendar invitation and click "accept" or otherwise agree to the meeting. At step 334B, the mail services 306 of the message services 304 creates a meeting for user B and adds the calendar invitation in mailbox/calendar storage 310B in user B's shared storage and services 308B.

At step 336A, the personalized contextual connection management system (not depicted) identifies a personalized contextual connection to the shared item for user A. The personalized contextual connection management system (not depicted) stores the contextual connection in an item contextual connection storage 312A of user A's shared storage and services 308A. User A's personalized contextual connection to the shared item as stored in this sequence is the meeting invitation.

At step 336B, the personalized contextual connection management system (not depicted) identifies a personalized connection to the shared item for user B. The personalized contextual connection management system (not depicted) stores the contextual connection in an item contextual connection storage 312B of user B's shared storage and services 308B. User B's personalized contextual connection to the shared item (as stored in this sequence) is the meeting invitation.

When User A or User B views the shared item, they will see the contextual connection of the meeting invitation. For example, when User A views the item 316 via the first client application 122A-1, a user service (not depicted) associated with the first client application 122A-1 obtains the personalized contextual connections stored in the item contextual connection storage 312A of the User A Shared storage and services 308A such that user A's personalized contextual connection of the meeting invitation can be displayed. Thus, when the user views the item, the user may also view the personalized contextual connection to the item.

Figure 3B:
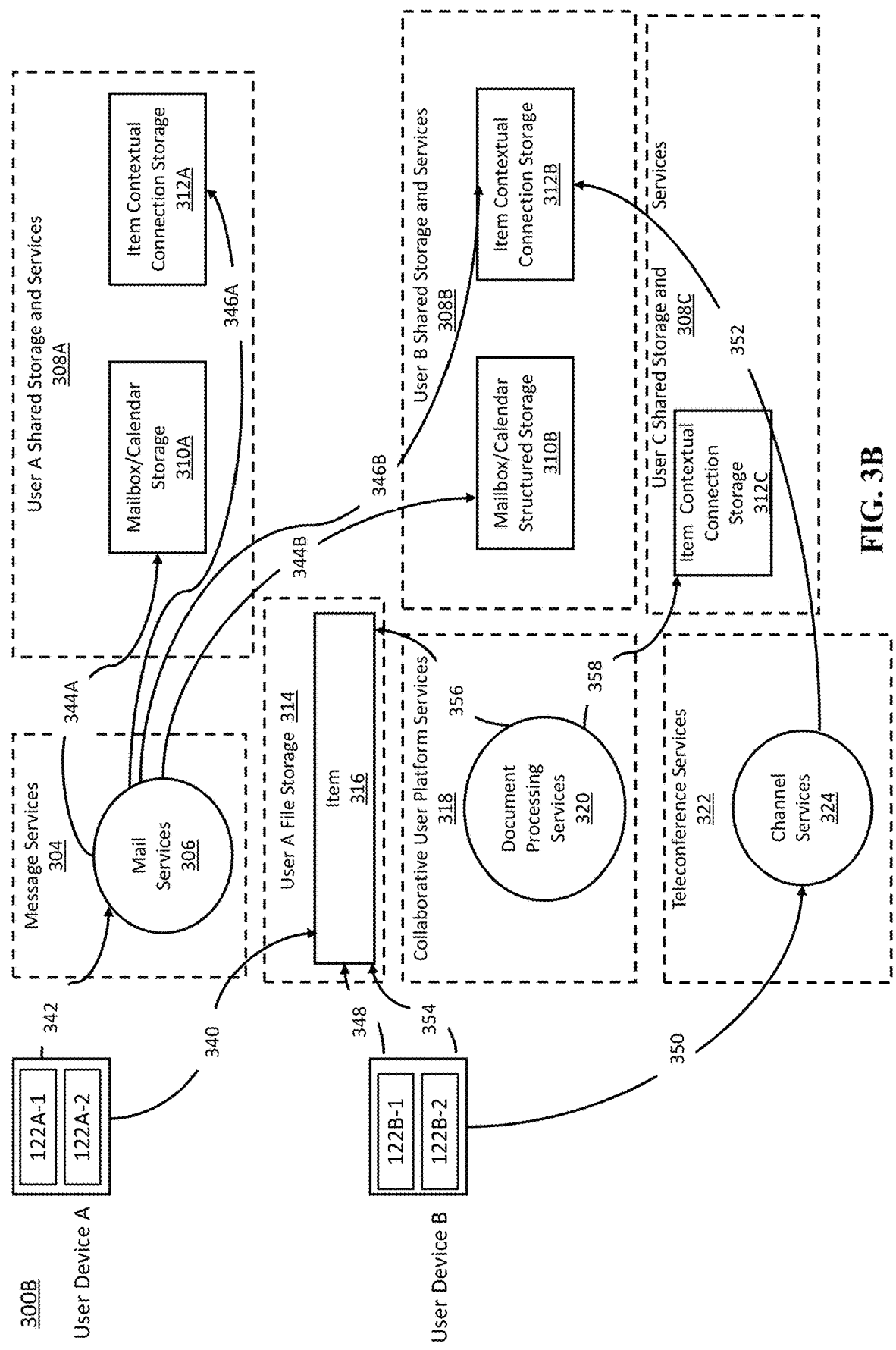
FIG. 3B illustrates another example user flow for contextual connections to items.

FIG. 3B illustrates another example user flow for contextual connections to items. User flow environment 300B illustrates user flows stemming from activity of user A and user B. Not shown is a personalized contextual connection management system 110, which would receive information from client applications and/or the various user services and store the personalized contextual connections in the item contextual connection storage 312A, 312B, 312C.

Referring to FIG. 3B, at step 340, user A, via first client application 122A-1, creates an item and the item is stored in a user A file storage 314 as item 316. In one example, first client application 122A-1 may be a notebook application and the item is a note.

Suppose that user A wishes to create a meeting request and include the item within the meeting request. The meeting request may include user B as the recipient.

At step 342, the user A, via second client application 122A-2, creates the meeting invitation and sends the meeting request to user B via the message services 304. Specifically, the mail services 306 of the message services 304 receives the meeting request that references the item (e.g., as an attachment or link). The meeting request can be considered a request associated with a task, where the task is the meeting invitation. The request may include an ID for user A (as the sender) and an ID for user B (as the recipient). The request may further include a reference to the shared item.

The personalized contextual connection management system (not depicted) may receive the request from the client application and forward the request to the mail services 306 of the message services 304 or may receive the request (or information about the request) from the mail services 306.

At step 344A, the mail services 306 of the message services 304 creates the meeting and adds the calendar invitation in the mailbox/calendar storage 310A in user A's shared storage and services 308A.

User B may receive the calendar invitation and click "accept" or otherwise agree to the meeting. At step 344B, the mail services 306 of the message services 304 creates a meeting for user B and adds the calendar invitation in the mailbox/calendar storage 310B in user B's shared storage and services 308B.

At step 346A, the personalized contextual connection management system (not depicted) identifies a personalized contextual connection to the shared item for user A. The personalized contextual connection management system (not depicted) stores the contextual connection in an item contextual connection storage 312A of user A's shared storage and services 308A. User A's personalized contextual connection to the shared item as stored in this sequence is the meeting invitation.

At step 346B, the personalized contextual connection management system (not depicted) identifies a personalized connection to the shared item for user B. The personalized contextual connection management system (not depicted) stores the contextual connection in an item contextual connection storage 312B of user B's shared storage and services 308B. User B's personalized contextual connection to the shared item stored in this sequence is the meeting invitation.

Suppose that user B wishes to add the note to a channel (e.g., Microsoft Teams Channel, SLACK channel) and share the item with user C. At step 348, for adding the note to a channel, user B's first client application 122B-1 obtains a sharing link to the item 316 that is stored in user A's file storage 314.

At step 350, the second user, via the first client application 122B-1 (or another client application), sends a request to channel services 324 of teleconference services 322 to post the item within the channel.

At step 352, the personalized contextual connection management system (not depicted) identifies a personalized connection to the shared item for user B. The personalized contextual connection management system (not depicted) stores the contextual connection in the item contextual connection storage 312B of user B's shared storage and services 308B. User B's personalized contextual connection to the shared item for this sequence of actions is the channel. In some cases, both the meeting invitation and the channel are stored as the personalized contextual connection of user B to the shared meeting item and are available for display as personal context with the shared meeting item.

At step 354, for sharing the item with user C, the second user, via the second client application 122B-2 (e.g., a notebook or other application with authoring/editing/commenting tools with associated collaborative user platform services) refers to or otherwise mentions user C in relation to the item. For example, user B may append or otherwise add user C by referencing "@ User C" as user B may wish to share the item with user C within a collaborative user platform service provided by collaborative user platform services 318.

At step 356, the document processing services 320 provided by collaborative user platform services 318 process a change to the item 316. The item may be updated based on the change and the changed item is stored as item 316.

At step 358, the personalized contextual connection management system (not depicted) identifies a personalized contextual connection to the shared item for user C. The personalized contextual connection management system (not depicted) stores the contextual connection in the item contextual connection storage 312C of user C's shared storage and services 308C. User C's contextual connection to the shared item is being referenced in the item (e.g., by being "@"-mentioned).

When User A views the shared item, they will see the contextual connection of the meeting invitation. For example, when User A views the item 316 via the first client application 122A-1, a user service (not depicted) associated with the first client application 122A-1 obtains the personalized contextual connections stored in the item contextual connection storage 312A of the User A Shared storage and services 308A such that user A's personalized contextual connection of the meeting invitation can be displayed. Thus, when user A views the item, the user may also view the personalized contextual connection to the item. When User B views the shared item, they may see the contextual connection of both the meeting invitation and the channel (among other personal context); and when User C views the item, they won't see the context of the meeting invitation or the channel (if they are not a member of the channel), but will see the contextual connection of being referenced in the item.

FIGS. 4A-4F illustrate example scenarios of personalized contextual connections.

Meeting Contextual Connection

User A creates a meeting, creates an invitation for the meeting, and invites User B and User C to the meeting. To each of these users (User A, User B, and User C), this note has the contextual connection of the meeting. Each user can navigate from the note to the meeting, see some details of the meeting in the note, and can get to the note from the meeting itself.

Figure 4A:
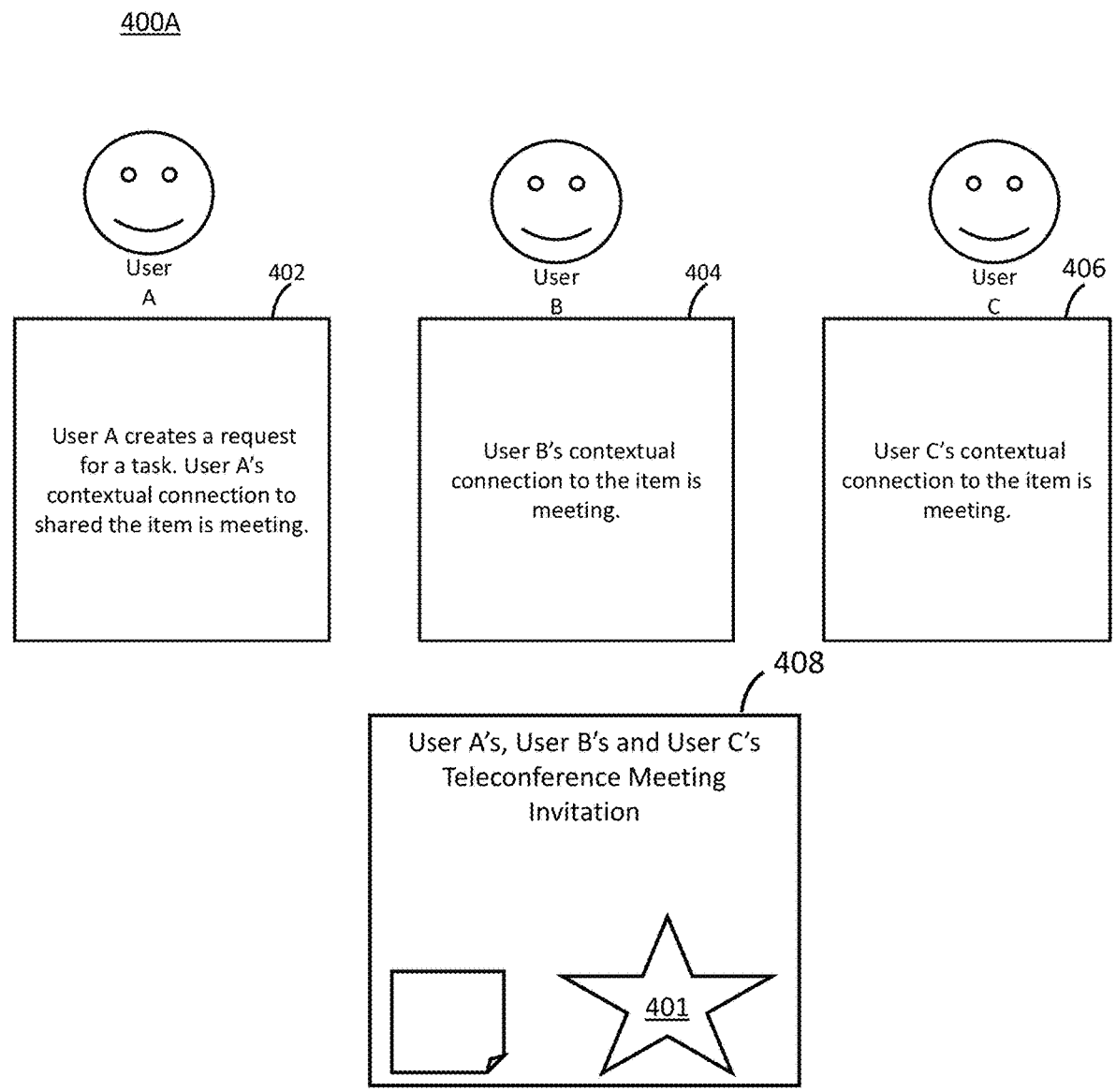
FIGS. 4A-4F illustrate example scenarios of personalized contextual connections.

Referring to FIG. 4A, user interaction environment 400A provides, in block 402, that user A creates a request for a task. The request for the task includes an identifier of the first user (ID of user A), a reference to a shared item, an identifier of a second user (ID of user B), and an identifier of a third user (ID of user C). User A's contextual connection to the shared item is meeting.

In block 404, it is shown that user B's contextual connection to the item is meeting.

In block 406, it is shown that user C's contextual connection to the item is meeting.

A graphical user interface 408 depicts an example meeting invitation for the teleconference that includes a link to a shared item 401.

Figure 4B:
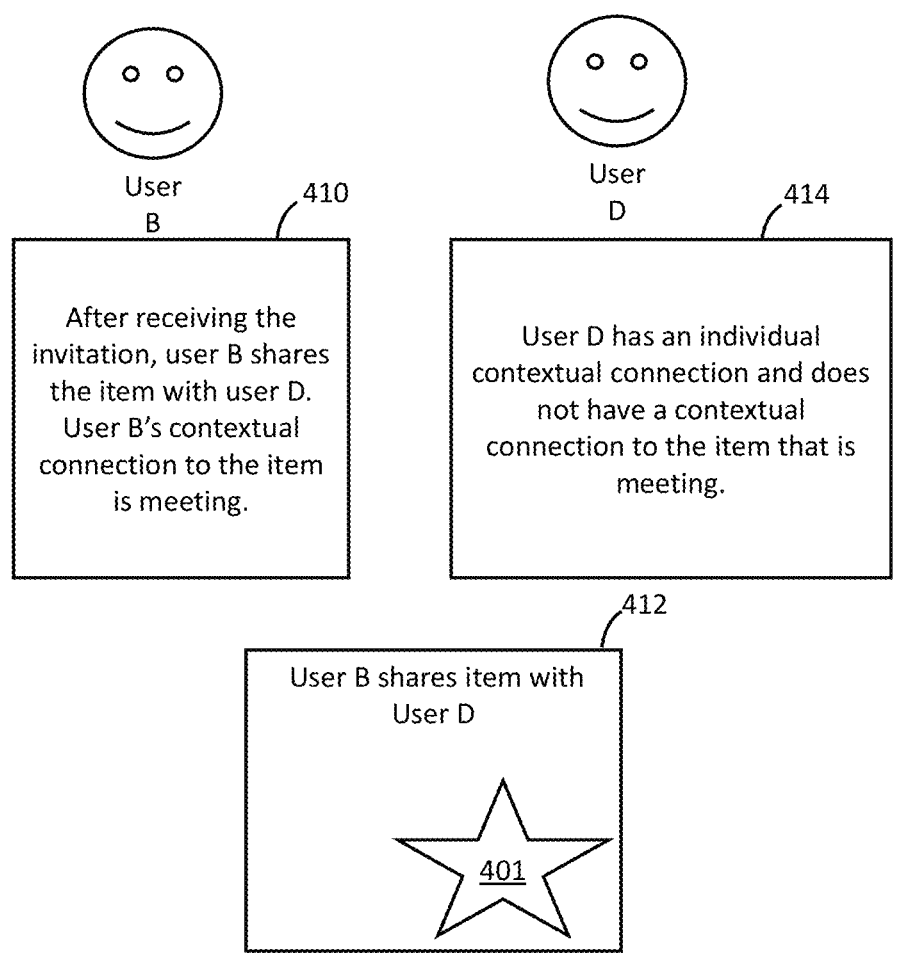

Suppose now upon receiving the invitation, user B wishes to open the shared item 401 and share it with user D. User D was not invited to the meeting. Referring to FIG. 4B, user interaction environment 400B provides, in block 410, that user B shares the item 401 with user D, as depicted in a graphical user interface 412.

In 414, it is shown that user D has an individual (and personal) contextual connection to the item but does not have a contextual connection to the item that is meeting, as in user B's case. User D may continue to see, utilize or otherwise access the item and may also view their individual contextual connection to the item, however, user D lacks a contextual connection to the item that is "meeting" since the meeting (which user D was not a part of) is not a known entity to D.

Email Contextual Connection

Figure 4C:
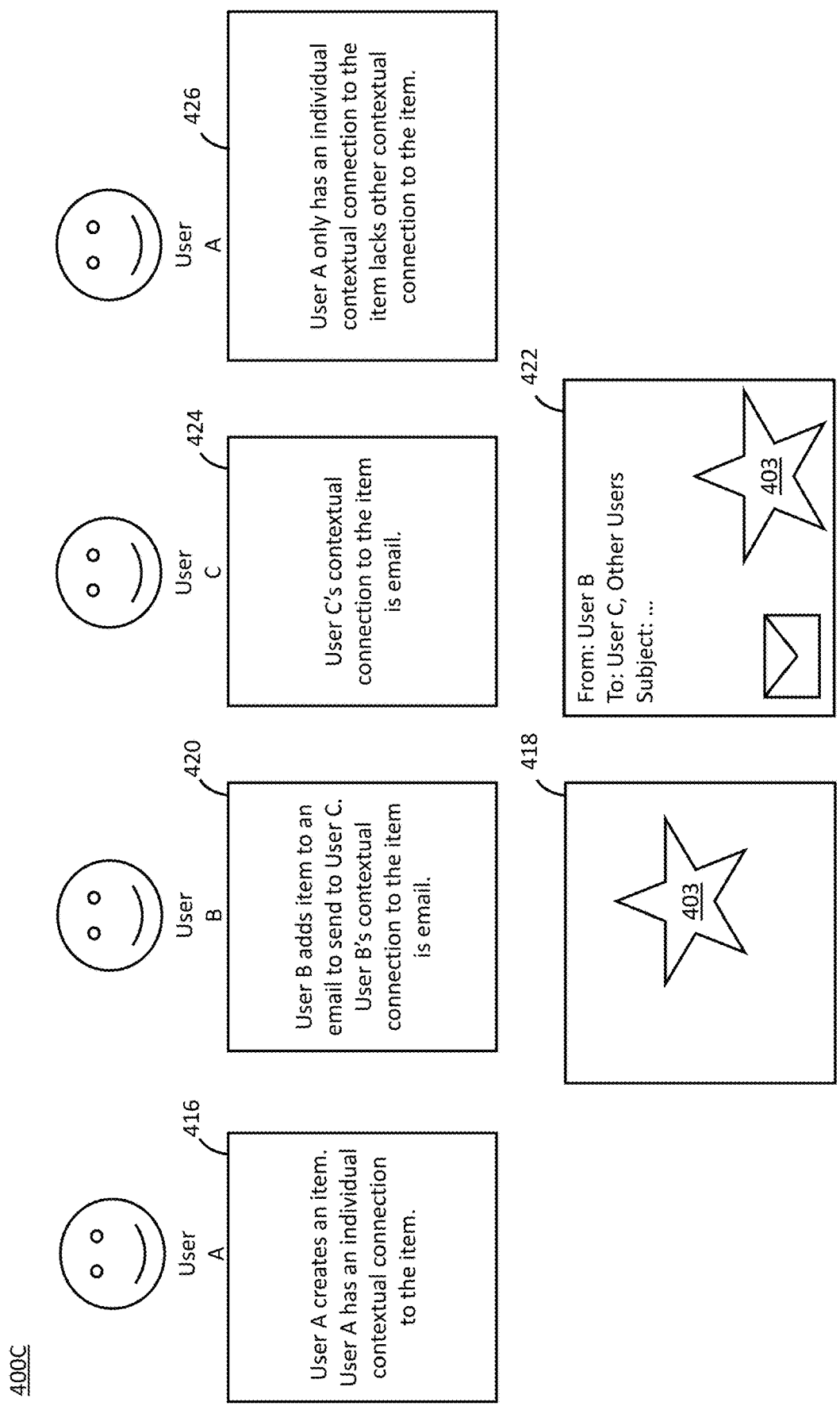

User A creates an item (e.g., a note). User B adds the item to an email to user C. At this time, there are no contextual connections for user A with respect to the item; however, for both user B and user C, the item has the contextual connection of the email (and the context of email is relevant to users B and C). Referring to FIG. 4C, user interaction environment 400C provides, in block 416, that user A creates an item 403, as depicted in a graphical user interface 418.

In block 420, user B obtains the item 403 and wishes to perform a task. The task is to add item to an email to send to user C. User B, via user B's client application, may send a request to perform the task to a message service. The request for the task includes an identifier of the first user (ID of user B), a reference to a shared item (item 403), and an identifier of a second user (ID of user C).

A graphical user interface 422 depicts an example email from user B to user C that includes a reference to the item 403 which may be attached to or linked in the email. User B's contextual connection to the item is email.

In block 424, user C's contextual connection to the item is email. All other users that have access to the email (i.e., who are recipients of the email, to whom the email is sent to) would have a contextual connection to the item that is email.

In block 426, it shown that user A has only an individual contextual connection to the item and still lacks other contextual connections to the item (e.g., lacks a contextual connection that is email) as user A was not a recipient of the email.

Channel Contextual Connection

A channel contextual connection to an item may exist. Suppose now that user A creates an item in a channel (e.g., a teleconference channel) and mentions user B. User B may be a member of the same channel. User B shares the item with user C who is not a member of the channel. User C then shares the item with User D who is a member of the channel (although user C may not know that user D is a member of the channel). User C does not see the contextual connection of the channel; however, it may be possible for user D to see the contextual connection as a member of the channel.

Figure 4D:
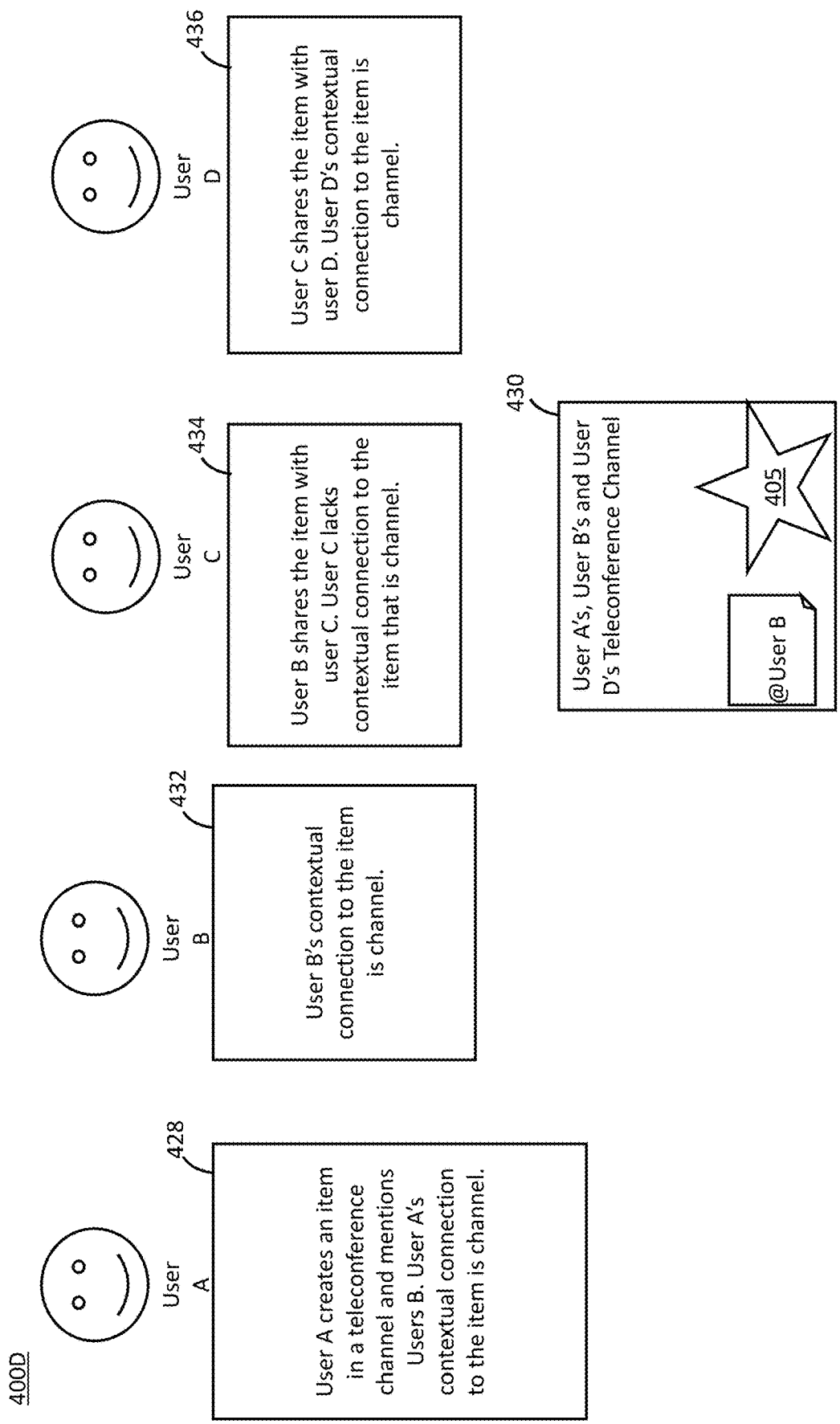

Referring to FIG. 4D, user interaction environment 400D provides, in block 428, that user A creates an item 405 in a teleconference channel (which is a channel that user A, user B, and user D are a part of), as depicted in a graphical user interface 430. User A's contextual connection to the item is channel. User A mentions user B in the channel (e.g., by referencing user B and adding in the user by providing the following command: "@user B" or using another method).

In block 432, user B's contextual connection to the item is channel.

User B then shares the item with user C. User C is not a member of the channel and therefore, user C lacks a contextual connection to the item that is channel, as shown in block 434. User C may have another contextual connection to the item (e.g., an individual contextual connection or another contextual connection) that is relevant to user C.

User C then shares the item with user D, as provided in block 436. User C may not be aware that user D is a member of the channel (as user C is not a member of the channel and may not even know about the channel's existence). User D's contextual connection to the item can include the channel as user D is a member of the channel.

Email and Channel Contextual Connection

Figure 4E:
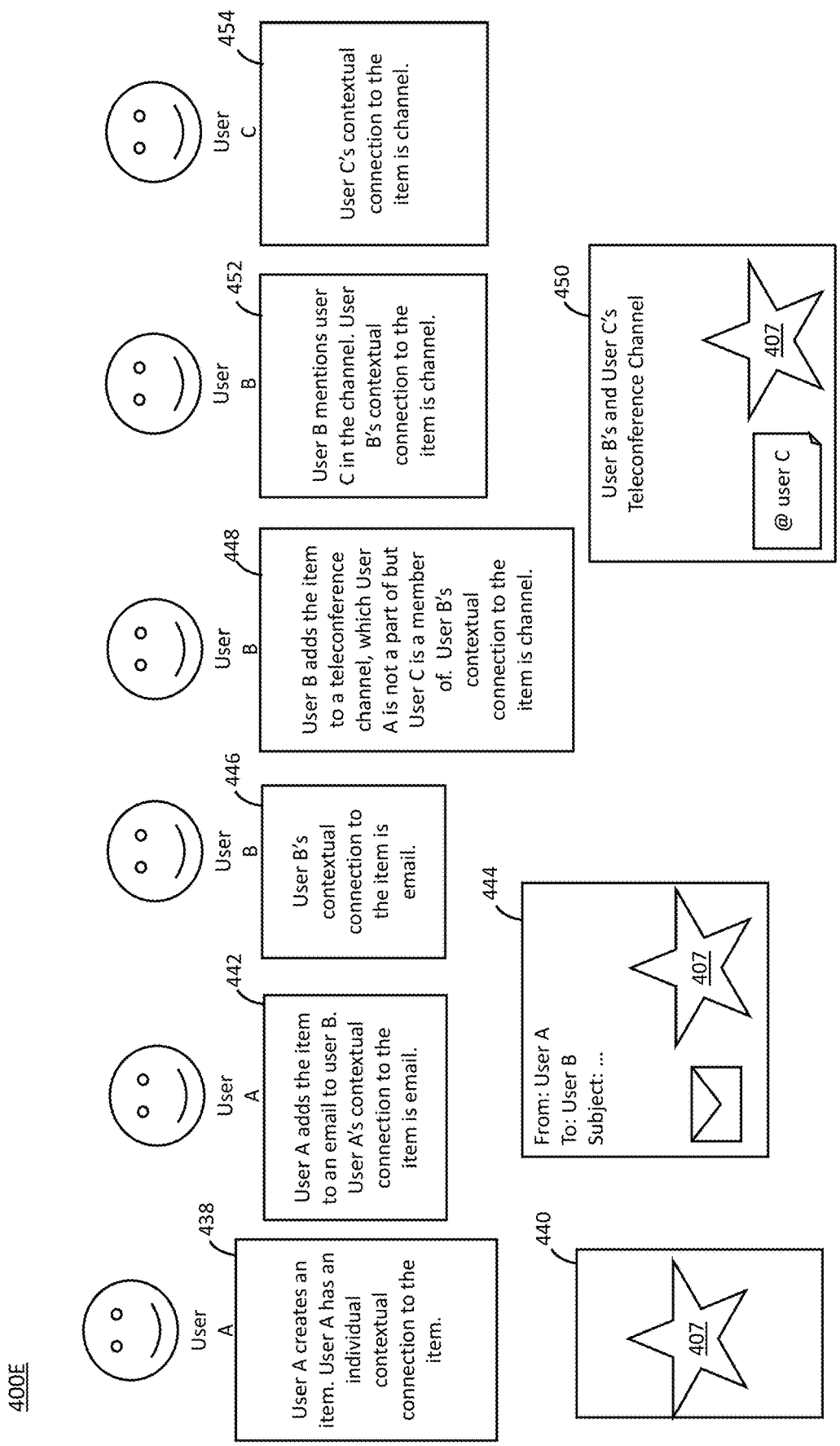

Suppose user A creates an item, adds the item to an email to user B. User B adds the item to a channel of which user A is not a part of but User C is a member. In addition, User B mentions user C in the item. Referring to FIG. 4E, user interaction environment 400E provides, in block 438, that user A creates an item 407, as depicted in a graphical user interface 440. At this time, there is no contextual connection to the item for user A.

In block 442, user A adds the item to an email to user B, as depicted in a graphical user interface 444. With this action, user A's contextual connection to the item is email.

In addition, user B's contextual connection to the item is email, as depicted in block 446.

In block 448, user B adds the item to a teleconference channel, as depicted in a graphical user interface 450. User A is not a member of the channel, but user C is. User B's contextual connection to the item is channel. User A lacks a contextual connection to the item that is channel (as user A is not part of the channel) but does have the contextual connection of the email as depicted in block 442.

In block 452, user B mentions user C in the channel. User B's contextual connection to the item is channel. In block 454, user C's contextual connection to the item is channel. The contextual connection to the item of channel may arise based on user B mentioning user C in the item in the channel or may arise simply because user C is a member of the channel. In some cases, user C may also have a contextual connection of being mentioned in the note.

In this embodiment, user A's contextual connection to the item is email (as user A is not a member of the channel). User C's contextual connection to the item is channel (since user C does not have access to the email). User B's contextual connection to the item is both email and channel.

Figure 4F:
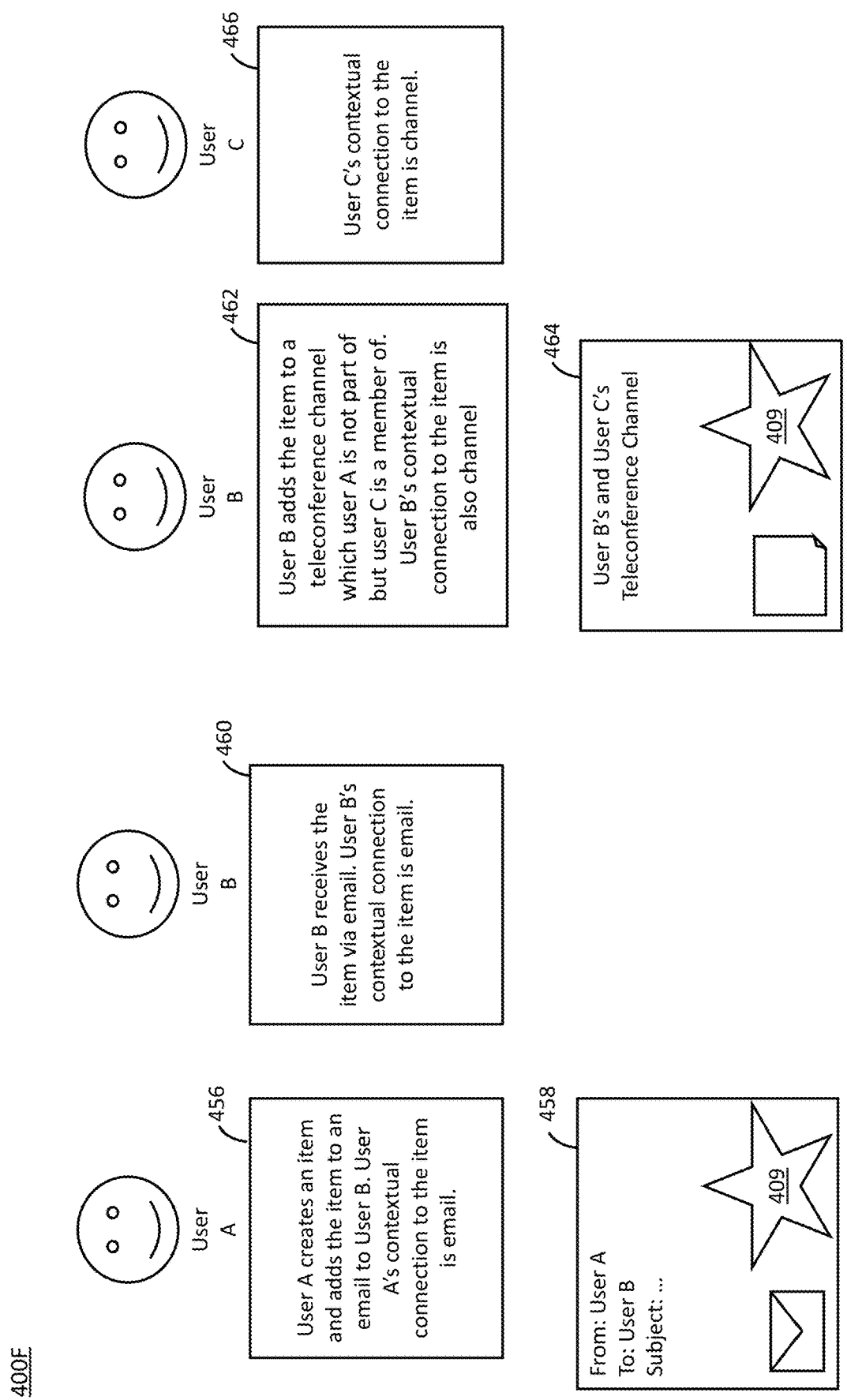

FIG. 4F illustrates another example. Referring to FIG. 4F, as another example, suppose user A creates an item and adds the item to an email. User interaction environment 400F of FIG. 4F provides, in block 456, that user A creates an item 409, as depicted in a graphical user interface 458 and adds the item to an email to send to user B. User A's contextual connection to the item is email.

In block 460, user B receives the item via email. User B's contextual connection to the item is email.

In block 462, user B adds the item to a teleconference channel as depicted in a graphical user interface 464. User A is not part of the channel, but user C is a member of the channel. User B's contextual connection to the item is both channel and email.

User C's contextual connection to the item is channel, as depicted in block 466.

In this example, when User A views the shared item, user A will see their personalized contextual connection to the item as email; when user B views the shared item, user B will see their personalized contextual connection to the item as email and channel (or one of them depending on predetermined rules); and when user C views the shared item, user C will see their personalized contextual connection to the item as channel.

Figure 5A:
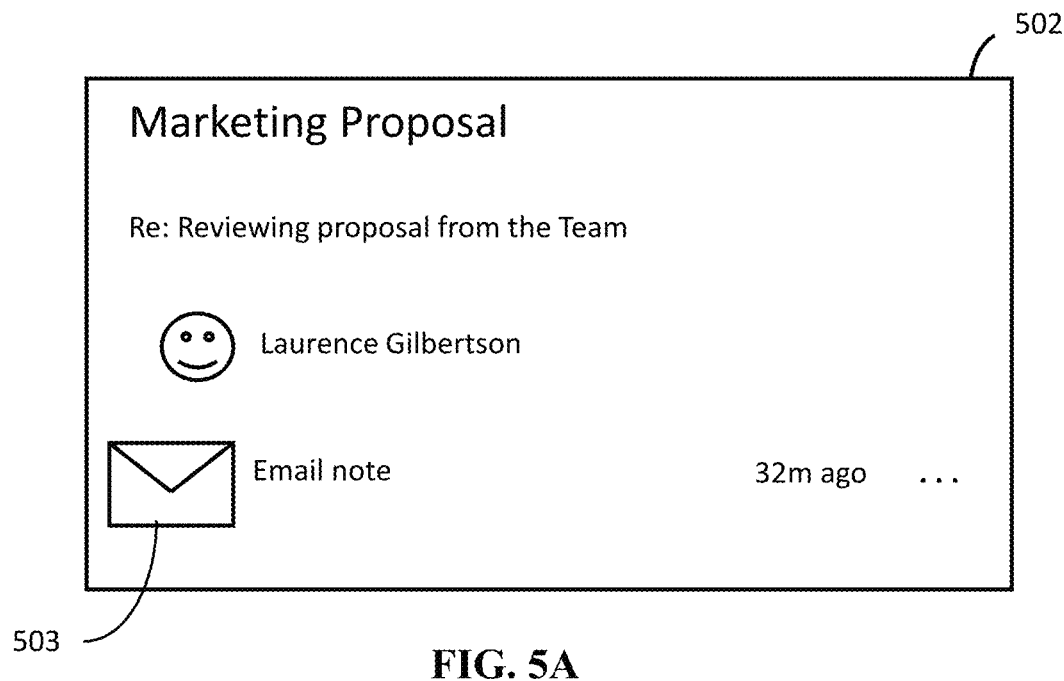
FIGS. 5A and 5B illustrate examples of graphical user interfaces of card including a shared item.
Figure 5B:

FIGS. 5A and 5B illustrate example graphical representations of interfaces surfacing a personalized contextual connection. FIG. 5A illustrates an example representation of a view that user A may see; and FIG. 5B illustrates an example representation of a view that user C may see.

Suppose that users A and C described with respect to FIG. 4F are provided with access to the item. Recall that user A's contextual connection to the item is email and user C's contextual connection to the item is channel. Referring to FIG. 5A, user A's graphical user interface card 502 for a shared item indicates context of email 503. In this interface, the item is represented to user A (who's personalized contextual connection to the item is email) within a card as an email note 503. Referring to FIG. 5B, user C's graphical user interface card 504 for a shared item indicates context of a teleconference meeting channel 505. In this interface, the item is presented to user C (who's personalized contextual connection to the item is channel) within a card as a channel note.

Some elements of the two graphical interface cards 502, 504 are the same. For example, the title and the creator are the same. However, other information is changed based on a user's personalized contextual connection to the note. For example, in the cards, the note type differs (email note vs. teleconference channel note) and the context type differs (the email states "Re: Reviewing proposal for the Team" whereas the teleconference channel states "Northwind Traders>>Marketing"). Additional information contained within the card and representative of the item may be changed and personalized in view of a user's personalized contextual connection to the item. The graphical user interface cards may be stored as part of user services (e.g., by a notebook service/application when the item is a note). In some cases, the graphical user interface cards may be provided similar to previews or thumbnails in various user experiences.

In other embodiments, the personalized contextual connections may be represented by text, audio, video, a combination thereof, or other types of data. In some embodiments, the personalized contextual connections may be provided as drop-down items in a drop-down menu alongside the item.

As can be seen by the various illustrative example presented above, if context is not relevant to a user and/or could provide information the person would not be normally privy to, even in a multi-user system, that context is not available to that user because contextual context remains distinct to the person. This prevents clutter and confusion and allows focus on the information being individualized. Each person is able to have a view of the context relevant to them, either because they provided the context or because they have access to context and the context would potentially allow for understandable meaning.

Figure 6:
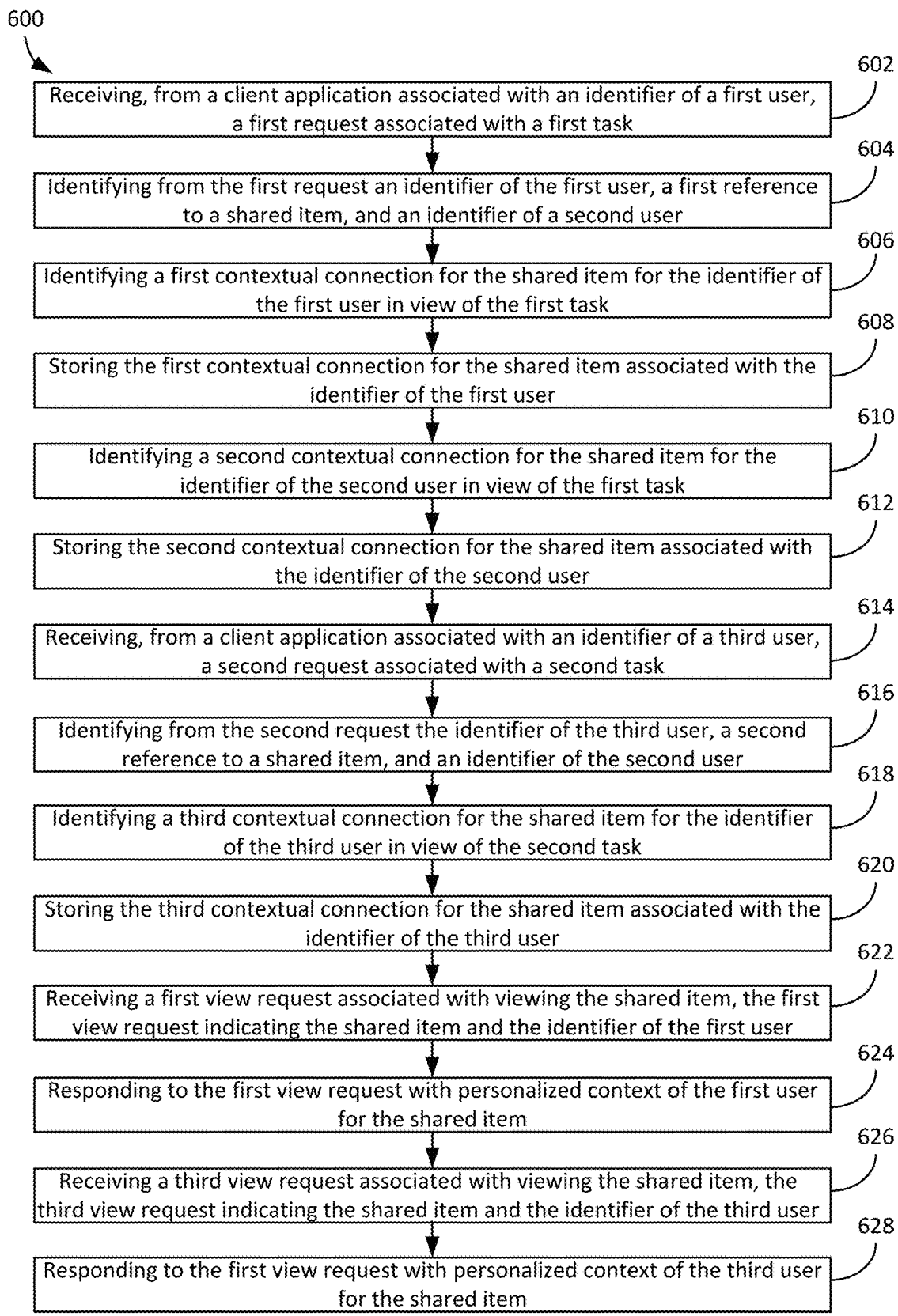
FIG. 6 illustrates a method to manage personalized contextual connections associated with a shared item in a multi-user system.

FIG. 6 illustrates a method to manage personalized contextual connections associated with a shared item in a multi-user system. The method of FIG. 6 may be carried out by a personalized contextual connection management system 110, which may be embodied as described with respect to system 700 of FIG. 7A. Multiple users may access a shared item. Relevant context with respect to tasks with connections to the shared item can be maintained personalized for each user.

Referring to FIG. 6, a method 600 for managing personalized contextual connections associated with a shared item for a multi-user system includes receiving (602), from a first client application associated with an identifier of a first user, a first request associated with a first task. The first request may be sent by a user employing user device A which includes user device A's first client application.

The first request may be a request to perform a first task such as send an email, send a calendar invitation to a teleconference meeting, create a teleconference meeting channel, share a document or other media with users in a collaborative environment, start an online discussion or chat, etc.

Method 600 further includes identifying (604), from the first request, the identifier of the first user, a first reference to a shared item, and an identifier of a second user. The first request may include an ID of the first user (ID for user A), a first reference to a shared item, and an ID of the second user (ID for user B).

Method 600 further includes identifying (606) a first contextual connection for the shared item for the identifier of the first user in view of the first task. The first contextual connection may be determined and created by a client application, a service (e.g., a user service), a personalized contextual connection management system, and/or a server and shared with or otherwise made accessible by the personalized contextual connection management system. The first contextual connection for the shared item associated with the identifier of the first user indicates the first user's relationship to the shared item. In some cases, the personalized contextual connection management system may identify the first contextual connection from the first request based on the type of request and/or items involved in the request. In some cases, the personalized contextual connection management system may identify the first contextual connection from the first request based on information sent with the request by the client application and/or associated user services.

Method 600 then includes storing (608) the first contextual connection for the shared item associated with the identifier of the first user.

Method 600 further includes identifying (610) a second contextual connection for the shared item for the identifier of the second user in view of the first task. The second contextual connection may be determined and created by a client application, a service (e.g., a user service), the personalized contextual connection management system, and/or a server and shared with or otherwise made accessible by the personalized contextual connection management system. The second contextual connection for the shared item associated with the identifier of the second user indicates the second user's relationship to the shared item. In some cases, the personalized contextual connection management system may identify the second contextual connection from the first request based on the type of request and/or items involved in the request. In some cases, the personalized contextual connection management system may identify the second contextual connection from the first request based on information sent with the request by the client application and/or associated user services.

Method 600 further includes storing (612) the second contextual connection for the shared item associated with the second user.

Method 600 further includes receiving (614) from a second client application associated with the identifier of the second user, a second request associated with a second task. The second task may involve a third user.

Method 600 further includes identifying (616), from the second request, at least an identifier of the third user and a second reference to the shared item. In some cases, the identifier of the second user is also identified from the second request.

Method 600 further includes identifying (618) a third contextual connection for the shared item for the identifier of the third user in view of the second task. The third contextual connection may be determined and created by a client application, a service (e.g., a user service), a personalized contextual connection management system, and/or a server and shared with or otherwise made accessible by the personalized contextual connection management system. The third contextual connection for the shared item associated with the identifier of the third user indicates the third user's relationship to the shared item. In some cases, the personalized contextual connection management system may identify the third contextual connection from the first request based on the type of request and/or items involved in the request. In some cases, the personalized contextual connection management system may identify the third contextual connection from the first request based on information sent with the request by the client application and/or associated user services.

Method 600 further includes storing (620) the third contextual connection for the shared item associated with the identifier of the third user. In some cases, the method can further include identifying, from the second request, the identifier of the second user; identifying a fourth contextual connection for the shared item for the identifier of the second user in view of the second task; and storing the fourth contextual connection for the shared item associated with the identifier of the second user. In such a case, the first user does not have a contextual connection for the shared item in view of the second task and therefore would not have access to information regarding the second task while both the second user and the third user would.

Method 600 further includes receiving (622) a first view request associated with viewing the shared item, the first view request indicating the shared item and the identifier of the first user; and responding (624) to the first view request with personalized context of the first user for the shared item, wherein the personalized context of the first user for the shared item comprises the first contextual connection.

Method 600 further includes receiving (626) a third view request associated with viewing the shared item, the third view request indicating the shared item and the identifier of the third user; and responding (628) to the third view request with personalized context of the third user for the shared item, wherein the personalized context of the third user for the shared item comprises the third contextual connection.

For the case where the personalized contextual connection management system identified the fourth contextual connection, when the system receives a second view request associated with viewing the shared item, where the second view request indicates the shared item and the identifier of the second user, the system can respond to the second view request with personalized context of the second user for the shared item, wherein the personalized context of the second user for the shared item includes the second contextual connection and the fourth contextual connection.

The personalized contextual connections are indicative of a respective relevancy of the shared item to a respective user in view of a respective task. The users can view the personalized contextual connection to the item displayed on their devices and be able to determine how the item was relevant to the user in view of the task.

The personalized contextual connections for the shared item may be substantially similar to or determined in view of the contextual connections for users. In one embodiment, the personalized contextual connections are provided in a format for display by user devices. The personalized contextual connection management system may store the personalized contextual connections in a data structure resource and share the personalized contextual connections with user services so the personalized contextual connections can be distributed with items.

Context for users are personalized and not made available to other users. For example, the first user may have access to the item, but the first user may not have any other contextual connections to the item besides the individual connection; whereas a second user that has a different contextual connection to the item may view contextual connections that differ from the first user. This prevents clutter and confusion and allows users to recognize how an item is relevant to them based on the contextual connections. A user is provided with a display of the context contextual relevant to the user which may be presented alongside the item.

Figure 7A:
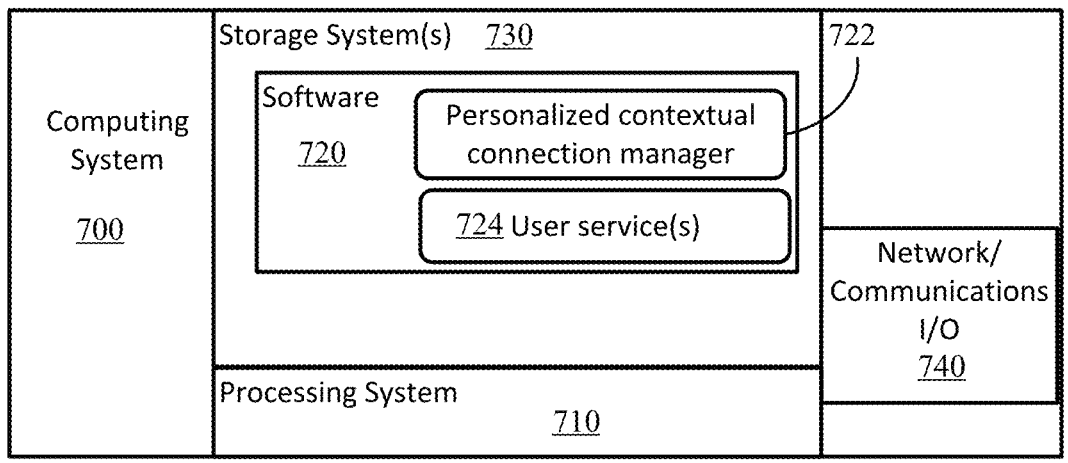
FIG. 7A illustrates components of an example computing system that may be used in certain embodiments described herein.

FIG. 7A illustrates components of an example computing system that may be used in certain embodiments described herein. Referring to FIG. 7A, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710. Storage system 730 may also include storage devices and/or sub-systems on which data such as entity-related information is stored. Storage system 730 can include any one of more of the structured data resources (e.g., user services structured data resource 116, structured data resource for user A, 112A, a structured data resource for user B, 112B, . . . and a structured data resource for user N, 112N described with respect to FIG. 1A.

Software 720 can include instructions for a personalized contextual connection manager 722 and/or user service(s) 724. The instructions for a personalized contextual connection manager 722 can include direct system 700 to operate as described herein with respect to the personalized contextual connection management system 110, including performing method 600 described with respect to FIG. 6. User service(s) 724 may be any of the services described herein, including one or more of user services 130 described with respect to FIG. 1B.

System 700 may represent any computing system on which software 720 may be staged and from where software 720 may be distributed, transported, downloaded, or otherwise provided to yet another computing system for deployment and execution, or yet additional distribution.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 740 may be included, providing communication connections and devices that allow for communication between system 700 and other computing systems (not shown) over a communication network or collection of networks (not shown) or the air.

Figure 7B:
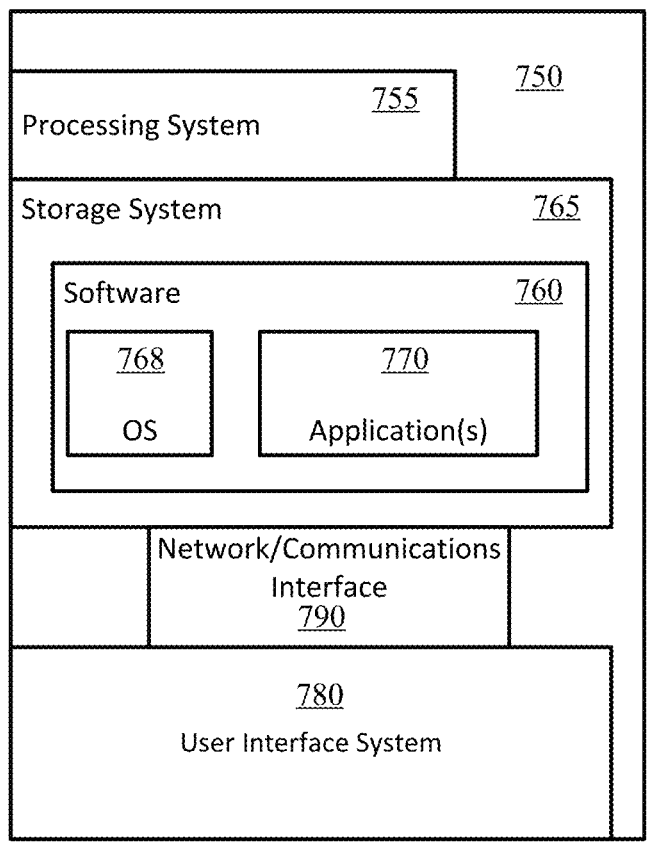
FIG. 7B illustrates components of an example computing device that may be used in certain embodiments described herein.

FIG. 7B illustrates components of an example computing device that may be used in certain embodiments described herein. Referring to FIG. 7B, system 750 may represent a computing device such as, but not limited to, a personal computer, a reader, a mobile device, a personal digital assistant, a wearable computer, a smart phone, a tablet, a laptop computer (notebook or netbook), a gaming device or console, an entertainment device, a hybrid computer, a desktop computer, or a smart television. Accordingly, more or fewer elements described with respect to system 750 may be incorporated to implement a particular computing device.

System 750 includes a processing system 755 of one or more processors to transform or manipulate data according to the instructions of software 760 stored on a storage system 765. Examples of processors of the processing system 755 include general purpose central processing units, application specific processors, and logic devices, as well as any other type of processing device, combinations, or variations thereof. The processing system 755 may be, or is included in, a system-on-chip (SoC) along with one or more other components such as network connectivity components, sensors, video display components.

The software 760 can include an operating system (OS) 768 and application programs such as various client applications 770 including email, channel, and various other productivity applications with associated user services.

Storage system 765 may comprise any computer readable storage media readable by the processing system 755 and capable of storing software 760 including the applications 770.

Storage system 765 may include volatile and nonvolatile memories, removable and non-removable media implemented in any method or technology for storage of information, such as computer readable instructions, data structures, program modules, or other data. Examples of storage media of storage system 765 include random access memory, read only memory, magnetic disks, optical disks, CDs, DVDs, flash memory, magnetic cassettes, magnetic tape, magnetic disk storage or other magnetic storage devices, or any other suitable storage media. In no case is the storage medium a transitory propagated signal.

The system can further include user interface system 780, which may include input-output (I/O) devices and components that enable communication between a user and the system 750. User interface system 780 can include input devices such as a mouse (not shown), track pad (not shown), keyboard (not shown), a touch device (not shown) for receiving a touch gesture from a user, a motion input device (not shown) for detecting non-touch gestures and other motions by a user, a microphone (note shown) for detecting speech, and other types of input devices and their associated processing elements capable of receiving user input.

The user interface system 780 may also include output devices such as display screen(s), speakers, haptic devices for tactile feedback, and other types of output devices. In certain cases, the input and output devices may be combined in a single device, such as a touchscreen, or touch-sensitive, display which both depicts images and receives touch gesture input from the user. A touchscreen (which may be associated with or form part of the display) is an input device configured to detect the presence and location of a touch. The touchscreen may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some embodiments, the touchscreen is incorporated on top of a display as a transparent layer to enable a user to use one or more touches to interact with objects or other information presented on the display.

Visual output may be depicted on the display (not shown) in myriad ways, presenting graphical user interface elements, text, images, video, notifications, virtual buttons, virtual keyboards, or any other type of information capable of being depicted in visual form.

The user interface system 780 may also include user interface software and associated software (e.g., for graphics chips and input devices) executed by the OS 768 in support of the various user input and output devices. The associated software assists the OS 768 in communicating user interface hardware events to application programs using defined mechanisms. The user interface system 780 including user interface software may support a graphical user interface, a natural user interface, or any other type of user interface. For example, the graphical user interfaces providing the personalized contextual connections and shared item for the application 770 described herein may be presented through user interface system 780.

Network/communications interface 790 may include communications connections and devices that allow for communication with other computing systems over one or more communication networks (not shown). Examples of connections and devices that together allow for inter-system communication may include network interface cards, antennas, power amplifiers, RF circuitry, transceivers, and other communication circuitry. The connections and devices may communicate over communication media (such as metal, glass, air, or any other suitable communication media) to exchange communications with other computing systems or networks of systems. Transmissions to and from the communications interface are controlled by the OS 768, which informs applications of communications events when necessary.

Certain techniques set forth herein with respect to the application and/or name mispronunciation feature may be described in the general context of computer-executable instructions, such as program modules, executed by one or more computing devices. Generally, program modules include routines, programs, objects, components, and data structures that perform particular tasks or implement particular abstract data types.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of managing personalized contextual connections associated with shared items in a multi-user system, the method comprising:
   receiving, from a first client application associated with an identifier of a first user, a first request associated with a first task;
   identifying, from the first request, the identifier of the first user, a first reference to a shared item, and an identifier of a second user;
   identifying a first contextual connection for the shared item for the identifier of the first user in view of the first task;
   storing the first contextual connection for the shared item associated with the identifier of the first user;
   identifying a second contextual connection for the shared item for the identifier of the second user in view of the first task;
   storing the second contextual connection for the shared item associated with the second user;
   receiving, from a second client application associated with an identifier of a second user, a second request associated with a second task;
   identifying, from the second request, at least an identifier of a third user and a second reference to the shared item;
   identifying a third contextual connection for the shared item for the identifier of the third user in view of the second task;
   storing the third contextual connection for the shared item associated with the identifier of the third user;
   receiving a first view request associated with viewing the shared item, the first view request indicating the shared item and the identifier of the first user;
   responding to the first view request with personalized context of the first user for the shared item, wherein the personalized context of the first user for the shared item comprises the first contextual connection;
   receiving a third view request associated with viewing the shared item, the third view request indicating the shared item and the identifier of the third user; and
   responding to the third view request with personalized context of the third user for the shared item, wherein the personalized context of the third user for the shared item comprises the third contextual connection.

2. The method of claim 1, wherein the first request associated with the first task comprises a meeting request to create a meeting,
   wherein identifying the second contextual connection for the shared item for the second user in view of the first task comprises identifying that the second user is a recipient of a meeting invitation for the meeting and that the second contextual connection is the meeting invitation, and
   wherein storing the second contextual connection for the shared item for the identifier of a second user associated with the second user comprises storing information of the meeting invitation such that the personalized context of the second user for the shared item comprises the information of the meeting invitation.

3. The method of claim 1, wherein the second request associated with the second task comprises updating the shared item including with a reference to the third user,
   wherein identifying the third contextual connection comprises identifying the reference to the third user and that the third contextual connection is a mention of the third user with respect to the shared item.

4. The method of claim 1, wherein the first contextual connection for the shared item is the same as the second contextual connection for the shared item and the third contextual connection for the shared item is different than the first contextual connection and the second contextual connection.

5. The method of claim 1, wherein the first user and the second user do not have access to the third contextual connection when viewing the shared item.

6. The method of claim 1, wherein the first contextual connection and the second contextual connection are one of an email, a teleconference meeting, or an online discussion and wherein the shared item is attached to or referenced by the one of the email, the teleconference meeting, or the online discussion.

7. The method of claim 1, further comprising:
   identifying, from the second request, the identifier of the second user;
   identifying a fourth contextual connection for the shared item for the identifier of the second user in view of the second task;
   storing the fourth contextual connection for the shared item associated with the identifier of the second user;

receiving a second view request associated with viewing the shared item, the second view request indicating the shared item and the identifier of the second user; and responding to the second view request with personalized context of the second user for the shared item, wherein the personalized context of the second user for the shared item comprises the second contextual connection and the fourth contextual connection.

8. The method of claim 1, wherein personalized contexts of users are provided in a format for display by corresponding user devices.

9. The method of claim 1, wherein the shared item comprises a digital note.

10. A personalized contextual connection management system comprising:
   a processing system;
   a storage system; and
   instructions for managing personalized contextual connections associated with shared items in a multi-user system stored at the storage system that when executed by the processing system, direct the personalized contextual connection management system to at least:
      receive, from a first client application associated with an identifier of a first user, a first request associated with a first task;
      identify, from the first request, the identifier of the first user, a first reference to a shared item, and an identifier of a second user;
      identify a first contextual connection for the shared item for the identifier of the first user in view of the first task;
      store the first contextual connection for the shared item associated with the identifier of the first user;
      identify a second contextual connection for the shared item for the identifier of the second user in view of the first task;
      store the second contextual connection for the shared item associated with the second user;
      receive, from a second client application associated with the identifier of the second user, a second request associated with a second task;
      identify, from the second request, at least an identifier of a third user and a second reference to the shared item;
      identify a third contextual connection for the shared item for the identifier of the third user in view of the second task;
      store the third contextual connection for the shared item associated with the identifier of the third user;
      receive a first view request associated with viewing the shared item, the first view request indicating the shared item and the identifier of the first user;
      respond to the first view request with personalized context of the first user for the shared item, wherein the personalized context of the first user for the shared item comprises the first contextual connection;
      receive a third view request associated with viewing the shared item, the third view request indicating the shared item and the identifier of the third user; and
      respond to the third view request with personalized context of the third user for the shared item, wherein the personalized context of the third user for the shared item comprises the third contextual connection.

11. The personalized contextual connection management system of claim 10, wherein the first request associated with the first task comprises a meeting request to create a meeting,
   wherein to identify the second contextual connection for the shared item for the second user in view of the first task, the personalized contextual connection management system identifies that the second user is a recipient of a meeting invitation for the meeting and that the second contextual connection is the meeting invitation, and
   wherein to store the second contextual connection for the shared item for the identifier of a second user associated with the second user, the personalized contextual connection management system stores information of the meeting invitation such that the personalized context of the second user for the shared item comprises the information of the meeting invitation.

12. The personalized contextual connection management system of claim 10, wherein the second request associated with the second task comprises updating the shared item including with a reference to the third user,
   wherein to identify the third contextual connection, the personalized contextual connection management system identifies the reference to the third user and that the third contextual connection is a mention of the third user with respect to the shared item.

13. The personalized contextual connection management system of claim 10, wherein the first contextual connection for the shared item is the same as the second contextual connection for the shared item and the third contextual connection for the shared item is different than the first contextual connection and the second contextual connection.

14. The personalized contextual connection management system of claim 10, wherein the first user and the second user do not have access to the third contextual connection when viewing the shared item.

15. The personalized contextual connection management system of claim 10, wherein the first contextual connection and the second contextual connection are one of an email, a teleconference meeting, or an online discussion and wherein the shared item is attached to or referenced by the one of the email, the teleconference meeting, the online discussion.

16. The personalized contextual connection management system of claim 10, wherein a fourth user has an individual personalized contextual connection to the shared item.

17. The personalized contextual connection management system of claim 10, wherein the personalized contexts of users are provided in a format for display by corresponding user devices.

18. The personalized contextual connection management system of claim 10, wherein the shared item comprises a digital note.

19. A computer readable storage medium having instructions stored thereon that, when executed by a computing system, direct the computing system to perform a method comprising:
   receiving, from a first client application associated with an identifier of a first user, a first request associated with a first task;
   identifying, from the first request, the identifier of the first user, a first reference to a shared item, and an identifier of a second user;
   identifying a first contextual connection for the shared item for the identifier of the first user in view of the first task;

storing the first contextual connection for the shared item associated with the identifier of the first user;

identifying a second contextual connection for the shared item for the identifier of the second user in view of the first task;

storing the second contextual connection for the shared item associated with the second user;

receiving, from a second client application associated with an identifier of the second user, a second request associated with a second task;

identifying, from the second request, at least an identifier of a third user and a second reference to the shared item;

identifying a third contextual connection for the shared item for the identifier of the third user in view of the second task;

storing the third contextual connection for the shared item associated with the identifier of the third user;

receiving a first view request associated with viewing the shared item, the first view request indicating the shared item and the identifier of the first user;

responding to the first view request with personalized context of the first user for the shared item, wherein the personalized context of the first user for the shared item comprises the first contextual connection;

receiving a third view request associated with viewing the shared item, the third view request indicating the shared item and the identifier of the third user; and responding to the third view request with personalized context of the third user for the shared item, wherein the personalized context of the third user for the shared item comprises the third contextual connection.

20. The computer readable storage medium of claim 19, further comprising instructions that, when executed by the computing system, direct the computing system to perform the method further comprising:

identifying, from the second request, the identifier of the second user;

identifying a fourth contextual connection for the shared item for the identifier of the second user in view of the second task;

storing the fourth contextual connection for the shared item associated with the identifier of the second user;

receiving a second view request associated with viewing the shared item, the second view request indicating the shared item and the identifier of the second user; and responding to the second view request with personalized context of the second user for the shared item, wherein the personalized context of the second user for the shared item comprises the second contextual connection and the fourth contextual connection.

\* \* \* \* \*